United States Patent
Duong et al.

(10) Patent No.: US 10,741,843 B2
(45) Date of Patent: Aug. 11, 2020

(54) DRY ENERGY STORAGE DEVICE ELECTRODE AND METHODS OF MAKING THE SAME

(71) Applicant: MAXWELL TECHNOLOGIES, INC., San Diego, CA (US)

(72) Inventors: Hieu Minh Duong, San Diego, CA (US); Haim Feigenbaum, Irvine, CA (US); Jian Hong, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 14/690,153

(22) Filed: Apr. 17, 2015

(65) Prior Publication Data

US 2015/0303481 A1    Oct. 22, 2015

Related U.S. Application Data

(60) Provisional application No. 61/981,602, filed on Apr. 18, 2014.

(51) Int. Cl.
| | | |
|---|---|---|
| *H01M 4/62* | (2006.01) | |
| *H01G 9/042* | (2006.01) | |
| *H01G 9/15* | (2006.01) | |
| *H01M 4/04* | (2006.01) | |
| *H01M 10/0525* | (2010.01) | |
| *H01M 4/131* | (2010.01) | |
| *H01M 4/1391* | (2010.01) | |
| *H01M 4/1393* | (2010.01) | |
| *H01M 4/587* | (2010.01) | |

(52) U.S. Cl.
CPC .......... *H01M 4/623* (2013.01); *H01G 9/0425* (2013.01); *H01G 9/15* (2013.01); *H01M 4/0435* (2013.01); *H01M 4/622* (2013.01); *H01M 4/625* (2013.01); *H01M 10/0525* (2013.01); *H01M 4/131* (2013.01); *H01M 4/1391* (2013.01); *H01M 4/1393* (2013.01); *H01M 4/587* (2013.01)

(58) Field of Classification Search
CPC .......... H01M 4/623; H01M 4/622; H01M 4/13
See application file for complete search history.

(56) References Cited

U.S. PATENT DOCUMENTS

| | | | |
|---|---|---|---|
| 6,114,061 A | 9/2000 | Dix et al. | |
| 6,120,565 A | 9/2000 | Dix et al. | |
| 6,120,656 A | 9/2000 | Dix et al. | |
| 6,294,290 B1 | 9/2001 | Kim | |
| 7,695,821 B2 | 4/2010 | Han et al. | |
| 7,700,225 B2 | 4/2010 | Jung et al. | |
| 7,939,600 B2 | 5/2011 | Mori et al. | |
| 2004/0086774 A1* | 5/2004 | Munoz | H01M 4/0433 204/280 |
| 2005/0266298 A1 | 12/2005 | Mitchell et al. | |
| 2007/0122698 A1 | 5/2007 | Mitchell et al. | |
| 2007/0166610 A1* | 7/2007 | Nakashima | H01M 4/13 429/128 |
| 2008/0131779 A1* | 6/2008 | Kami | H01M 4/661 429/221 |
| 2009/0117461 A1* | 5/2009 | Shembel | H01M 4/0404 429/217 |
| 2010/0263910 A1 | 10/2010 | Mitchell et al. | |
| 2011/0114896 A1 | 5/2011 | Mitchell et al. | |
| 2013/0255872 A1* | 10/2013 | Zhong | H01M 4/04 156/242 |
| 2014/0159668 A1* | 6/2014 | Whitacre | H01G 11/50 320/130 |
| 2016/0285064 A1* | 9/2016 | Hatta | H01M 2/166 |

FOREIGN PATENT DOCUMENTS

| | | |
|---|---|---|
| CN | 101286563 A | 10/2008 |
| CN | 102569719 | 7/2012 |
| CN | 103346290 A | 10/2013 |
| EP | 2579369 | 10/2013 |
| JP | H08-106897 | 4/1996 |
| JP | H10-106540 | 4/1998 |
| JP | H11-307402 | 5/1999 |
| JP | 2001-52968 A | 2/2001 |
| JP | 2001110418 | 4/2001 |
| JP | 2005-174631 | 6/2005 |
| JP | 2008-541339 | 11/2008 |
| WO | WO 2000/067338 | 11/2000 |
| WO | WO 2006/135495 A1 | 12/2006 |

OTHER PUBLICATIONS

Nagai, A. "Applications of Polyvinylidene Fluoride-Related Materials for Lithium-Ion Batteries" Lithium-Ion Batteries: Science and Technologies, pp. 155-162, New York, NY: Springer, 2009.
Liu, W et al. "Electrochemical and X-ray photospectroscopy Studies of Polytetrafluoroethylene and Polyvinylidene Fluoride in Li/C Batteries," J. Power Sources, vol. 68, Issue 2, pp. 344-347, 1997.
Stephan, A.M. "Review on Gel Polymer Electrolytes for Lithium Batteries," A.M. Eur. Polym. J.., vol. 42, Issue 1, pp. 21-42, 2006.
Li, et al. "Evaluation residual moisture in lithium-ion battery electrodes and its effect on electrode performance" *MRS Advances* 1.15 (2016): 1029-1035.
Wood, et al. "Technical and economic analysis of solvent-based lithium-ion electrode drying with water and NMP" *Drying Technology* 36.2 (2018): 234-244.

* cited by examiner

*Primary Examiner* — Ladan Mohaddes
(74) *Attorney, Agent, or Firm* — Knobbe, Martens, Olson & Bear, LLP

(57) ABSTRACT

An energy storage device can include a cathode and an anode, where at least one of the cathode and the anode are made of a polytetrafluoroethylene (PTFE) composite binder material including PTFE and at least one of polyvinylidene fluoride (PVDF), a PVDF co-polymer, and poly(ethylene oxide) (PEO). The energy storage device can be a lithium ion battery, a lithium ion capacitor, and/or any other lithium based energy storage device. The PTFE composite binder material can have a ratio of about 1:1 of PTFE to a non-PTFE component, such a PVDF, PVDF co-polymer and/or PEO.

20 Claims, 36 Drawing Sheets

| Binder | 1st Lithiation Capacity (mAh/g) | 1st Delithiation Capacity (mAh/g) | Irreversible Capacity (mAh/g) |
|---|---|---|---|
| PTFE | 418 | 291 | 127 |
| PVDF | 332 | 309 | 23 |
| PE | 339 | 309 | 30 |

FIG. 5

| Binder | 1st Lithiation Capacity (mAh/g) | 1st Delithiation Capacity (mAh/g) | Irreversible Capacity (mAh/g) | Irreversible Capacity (%) |
|---|---|---|---|---|
| PTFE | 418 | 291 | 127 | 30 |
| PTFE/PE | 422 | 317 | 105 | 25 |
| PTFE/PVDF | 435 | 323 | 112 | 26 |
| PTFE/PEO | 382 | 346 | 36 | 9 |

FIG. 7C

| Binder | 1st Lithiation Capacity (mAh/g) | 1st Delithiation Capacity (mAh/g) | Irreversible Capacity (mAh/g) | Irreversible Capacity (%) |
|---|---|---|---|---|
| PTFE/PEO (dry) | 382 | 346 | 36 | 9 |
| PVDF (wet) | 332 | 309 | 23 | 7 |

FIG. 8B

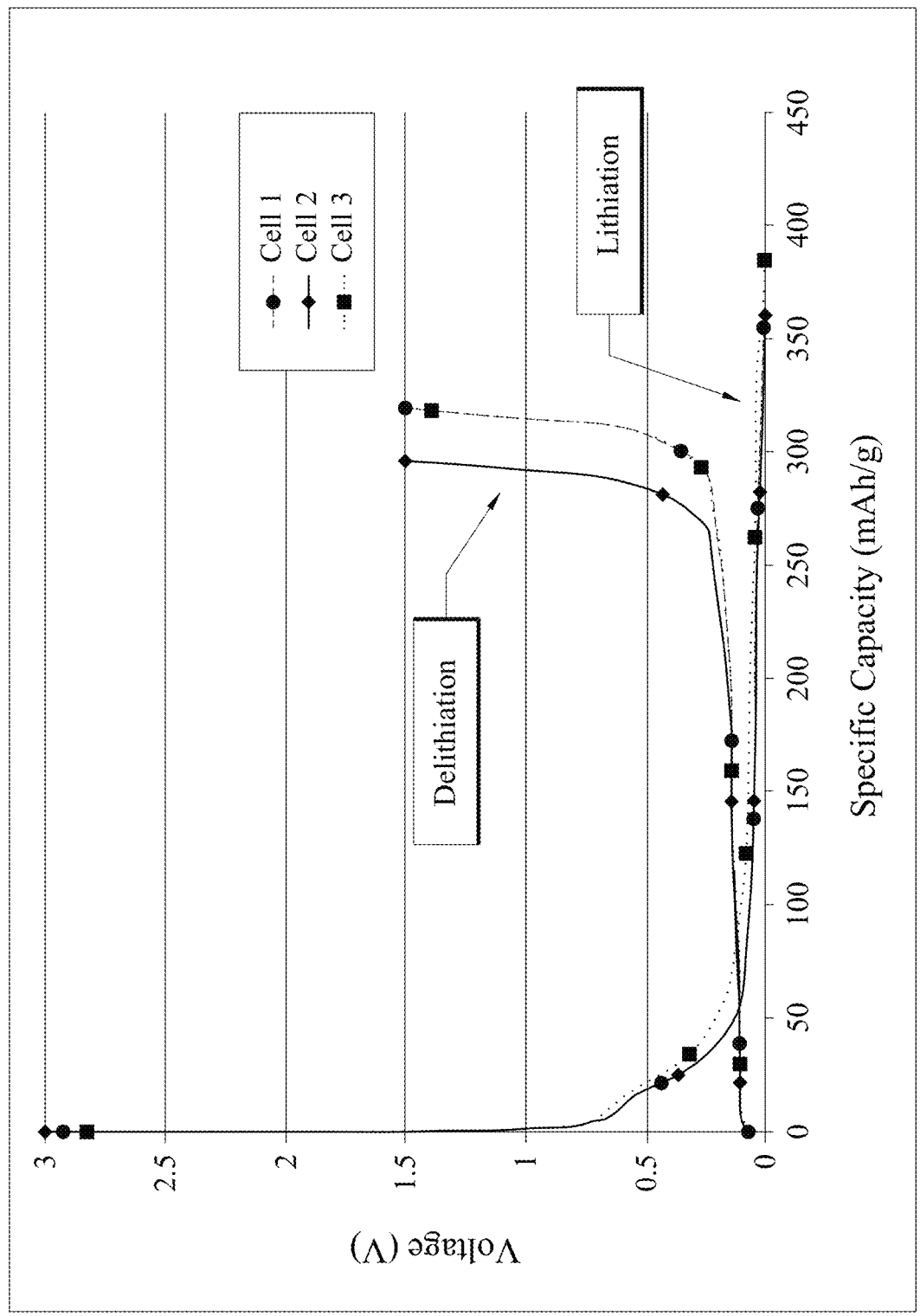
FIG. IIA

|  | Specific Charge Capacity (mAh/g) | Specific Discharge Capacity (mAh/g) | Irreversible Capacity (%) |
| --- | --- | --- | --- |
| Cell 1 | 388 | 319 | 17.8 |
| Cell 2 | 364 | 296 | 18.7 |
| Cell 3 | 385 | 317 | 17.7 |

FIG. 11B

|  | Specific Charge Capacity (mAh/g) | Specific Discharge Capacity (mAh/g) | Irreversible Capacity (%) |
|---|---|---|---|
| Cell 1 | 341 | 255 | 25.1 |
| Cell 2 | 330 | 248 | 24.9 |
| Cell 3 | 370 | 280 | 24.4 |
| Cell 4 | 338 | 254 | 24.8 |
| Cell 5 | 374 | 287 | 23.1 |

FIG. 12B

| | Specific Charge Capacity (mAh/g) | Specific Discharge Capacity (mAh/g) | Irreversible Capacity (%) |
|---|---|---|---|
| Cell 1 | 286 | 213 | 25.8 |
| Cell 2 | 311 | 234 | 24.8 |
| Cell 4 | 331 | 254 | 23.3 |
| Cell 5 | 305 | 231 | 24.4 |

FIG. 13B

|  | Specific Charge Capacity (mAh/g) | Specific Discharge Capacity (mAh/g) | Irreversible Capacity (%) |
|---|---|---|---|
| Cell 1 | 344 | 281 | 18.1 |
| Cell 2 | 348 | 284 | 18.3 |
| Cell 3 | 385 | 321 | 16.6 |
| Cell 4 | 343 | 282 | 17.8 |

FIG. 14B

| Binder | Powder Processing Conditions | Avg. Irreversible Capacity (%) |
|---|---|---|
| PVDF | Mixed at room temperature | 18 |
| PTFE | Mixed at room temperature | 24.5 |
| PTFE/PVDF | Cooled before mixing | 24.6 |
| PTFE/PVDF | Mixed at room temperature | 17.7 |

FIG. 15

PVDF aggregates

Streaks and/or Surface pitting

DRY ENERGY STORAGE DEVICE ELECTRODE AND METHODS OF MAKING THE SAME

CROSS-REFERENCE TO RELATED APPLICATIONS

This application claims the benefit of U.S. Provisional Patent Application No. 61/981,602, filed Apr. 18, 2014, entitled "DRY ENERGY STORAGE DEVICE ELECTRODE AND METHODS OF MAKING THE SAME," the disclosure of which is incorporated herein by reference in its entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates generally to a dry energy storage device electrode, energy storage devices implementing such an electrode, and related methods.

Description of the Related Art

Many conventional energy storage devices and related methods are known. Generally, binder materials are combined with active electrode materials and other additives, and processed in a way that forms an electrode film. The electrode film is generally applied to one or more other layers of material to form an electrode. Generally a negative electrode (anode) and positive electrode (cathode) are formed, with a separator positioned therebetween, and inserted into a housing with electrolyte to form various types of energy storage devices.

The electrode films used within energy storage device electrodes may be formed using wet or dry processes. For example, active electrode materials may be combined with binder materials, solvents, and other additives, in a wet coating method which requires substantial subsequent drying techniques to fabricate an electrode film.

Dry electrode processes have been developed to reduce the time-consuming and costly drying procedures required by the aforementioned wet processes. For example, electrode processes can include combining a polytetrafluoroethylene (PTFE) binder with active electrode material, and calendering to form an electrode film. However, an energy storage device including an electrode made of a PTFE binder may exhibit undesired device performance, such as increased irreversible capacity loss during redox processes.

SUMMARY

Embodiments include an energy storage device having a cathode, an anode and a separator between the anode and the cathode, where at least one of the cathode and the anode includes a polytetrafluoroethylene (PTFE) composite binder material. The PTFE composite binder material can include PTFE and at least one of polyvinylidene fluoride (PVDF), a PVDF co-polymer, and poly(ethylene oxide) (PEO).

In some embodiments, the lithium based energy storage device can include a lithium based energy storage device. The lithium based energy storage device can be a lithium ion battery or a lithium ion capacitor.

In some embodiments, the PTFE composite binder material can include up to about 50 weight % of PTFE. The PTFE composite binder material can include the PTFE and one of the PVDF, PVDF co-polymer or PEO, where the PTFE composite binder material can include a mass ratio at about 1:3 to about 3:1 of the PTFE to the PVDF, or the PTFE to the PVDF co-polymer, or the PTFE to the PEO. In some embodiments, the cathode or the anode can include an electrode film having to about 20 weight % of the PTFE composite binder material.

In some embodiments, at least one of the cathode and the anode can include a dry process based electrode film. In some embodiments, the cathode can include a cathode PTFE composite binder material and the anode can include an anode PTFE composite binder material. The cathode PTFE composite binder material can be different from the anode PTFE composite binder material.

Embodiments include an electrode of an energy storage device including a polytetrafluoroethylene (PTFE) composite binder material. The PTFE composite binder material can include PTFE and at least one of polyvinylidene fluoride (PVDF), a PVDF co-polymer, and poly(ethylene oxide) (PEO).

In some embodiments, the electrode can be an anode of the energy storage device. In some embodiments, the energy storage device is a lithium ion battery or a lithium ion capacitor. In some embodiments, the electrode can include a carbon active material, where the carbon active material includes graphite. In some embodiments, the electrode can be a cathode of the energy storage device. In some embodiments, the PTFE composite binder material of the cathode can include the PTFE and one of the PVDF, PVDF co-polymer or PEO, and where the PTFE composite binder material comprises a mass ratio of about 1:5 to about 5:1 of the PTFE to the PVDF, the PTFE to the PVDF co-polymer, or the PTFE to the PEO.

In some embodiments, the electrode can include a dry process based electrode film.

In some embodiments, the electrode can include about 5 weight % to about 10 weight % of the PTFE composite binder material. The PTFE composite binder material of the electrode can include up to about 50 weight % of PTFE.

Embodiments include a method of fabricating an anode of an energy storage device. The method can include combining an active material and at least one component of a polytetrafluoroethylene (PTFE) composite binder material to form a first mixture, where the at least one component can include at least one of polyvinylidene fluoride (PVDF), a PVDF co-polymer, and poly(ethylene oxide) (PEO). The method can include adding PTFE to the first mixture to form a second mixture; and subjecting the second mixture to a high shear process.

In some embodiments, both the combining and adding can include blending at a temperature of about 20° C. to about 75° C. Subjecting the second mixture to the high shear process may include fibrillizing the PTFE. In some embodiments, fibrillizing can include jet-milling.

In some embodiments, the energy storage device can be a lithium ion battery or a lithium ion capacitor.

In some embodiments, the combining can include combining a conductive carbon additive with the active material and the at least one component of the PTFE composite binder material to form the first mixture.

The method can be performed as a dry process. In some embodiments, the method can include calendering the electrode film mixture to form a free-standing electrode film.

In some embodiments, a mass ratio of PTFE to the at least one component is about 1:3 to about 3:1.

Embodiments include a method of fabricating a cathode of an energy storage device. The method can include combining a porous carbon material and at least one component of a polytetrafluoroethylene (PTFE) composite binder material to form a first mixture, where the at least one component comprises at least one of polyvinylidene fluoride (PVDF), a PVDF co-polymer, and poly(ethylene oxide) (PEO). The method can include subjecting the first mixture including the porous carbon material and the at least one component of the PTFE composite binder material to a high shear process; and adding PTFE to the first mixture to form a second mixture.

In some embodiments, the energy storage device is a lithium ion battery or a lithium ion capacitor.

In some embodiments, the porous carbon material includes activated carbon, where the at least one component includes PVDF, and where combining includes combining the first portion of the activated carbon and the PVDF at a mass ratio of about 1:1 to about 5:1.

In some embodiments, combining comprises combining a first portion of porous carbon material and the at least one component of the PTFE composite binder, and the method further includes combining with an active material of the cathode, a second portion of the porous carbon material and a conductive carbon additive to form a third mixture; and combining the third mixture with the first mixture after the subjecting step. In some embodiments, the active material can include lithium nickel manganese cobalt oxide.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

FIG. 5 is a table listing specific capacity performances during lithiation and delithiation for the energy storage device half-cells of FIG. 4.

FIG. 7C is a table listing specific capacity performances during lithiation and delithiation for the energy storage device half-cells of FIGS. 7A and 7B.

FIG. 8B is a table listing specific capacity performance during lithiation and delithiation of the energy storage device half-cell in FIG. 8A.

FIG. 11A shows specific capacity performances during lithiation and delithiation of examples of energy storage device half-cells.

FIG. 11B is a table listing specific lithiation and delithiation capacity performances of the energy storage device half-cells of FIG. 11A.

FIG. 12B is a table listing specific capacity performances during lithiation and delithiation of the energy storage device half-cells of FIG. 12A.

FIG. 13B is a table listing specific capacity performances during lithiation and delithiation of the energy storage device half-cells of FIG. 13A.

FIG. 14B is a table listing the specific capacity performances during lithiation and delithiation of the energy storage device half-cells of FIG. 14A.

FIG. 15 is a table listing average specific capacity performances during lithiation and delithiation of the energy storage device half-cells of FIGS. 11A through 14B.

DETAILED DESCRIPTION

Figure 1:
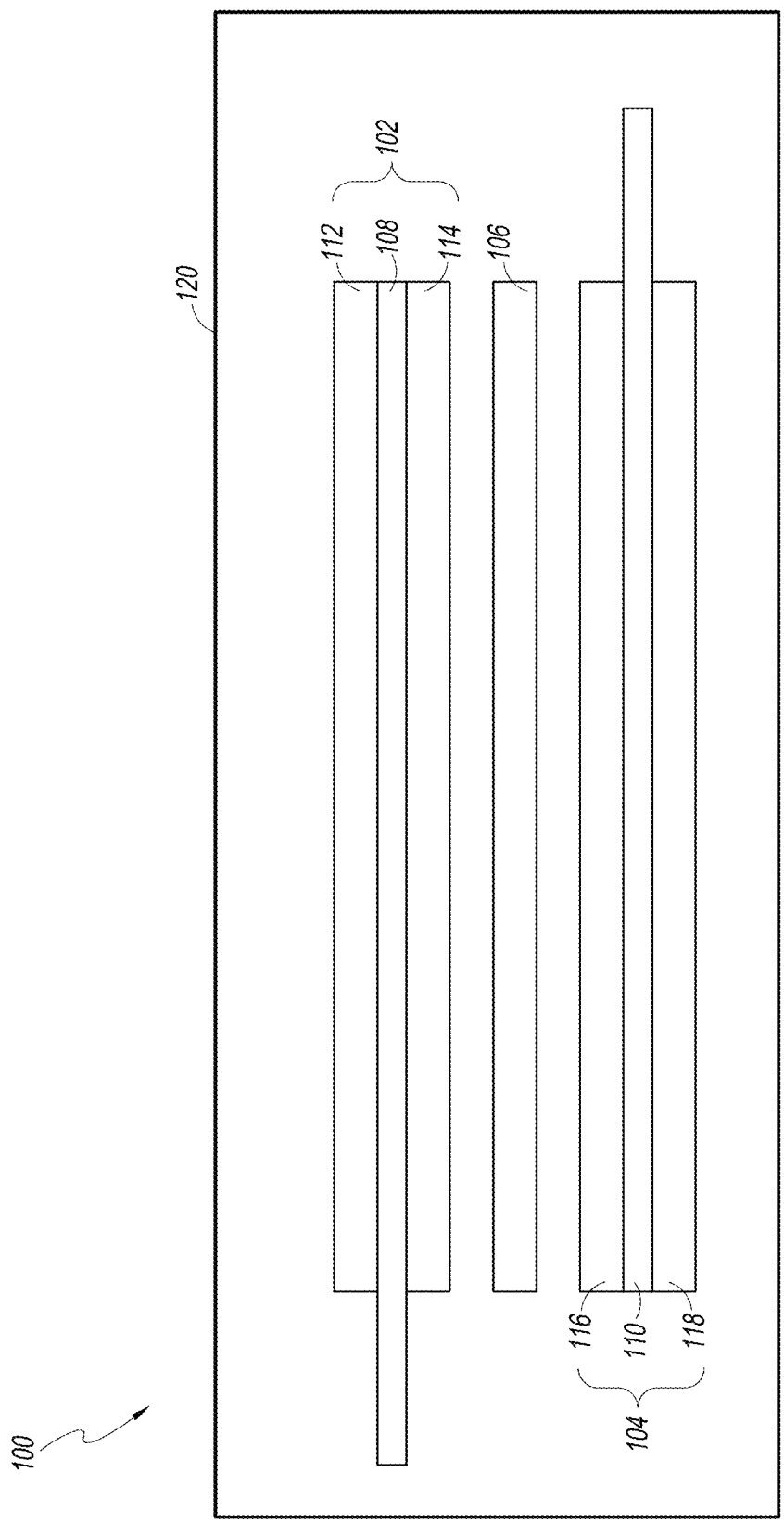
FIG. 1 shows a side cross-sectional schematic view of an example of an energy storage device.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

As described herein, dry electrode processes have been developed to reduce the time-consuming and costly drying procedures required by the aforementioned wet processes. Dry electrode processes have also been developed that improve upon use of a polytetrafluoroethylene (PTFE) binder combined with active electrode material, without the use of other binder materials, and calendered to form an electrode film. For example, the electrochemical instability and degradation of PTFE during redox processes may cause an irreversible loss in capacity of an electrode formed from a PTFE binder. This irreversible loss in capacity ultimately reduces the energy density of an energy storage device and can lower the durability and cycle life of the corresponding electrode. The instability of PTFE and such loss in capacity may be exacerbated at lower operating voltages. For example, the instability of PTFE binder at lower operating potentials can significantly reduce the energy density of a lithium ion battery and/or a lithium ion capacitor.

Electrodes formed with binders that have lower ionic conductivity, such as PTFE, may rely on pores within the binder or other materials in the electrode layer to provide the ion transfer therethrough. However, such binder materials may also inherently form electrode films with reduced porosity when compressed, due to the mechanical properties of the binder and its interaction with the other materials used in the films. For example, PTFE binder, when mixed with active material in a dry process and compressed, may form a dry densified electrode film with lower porosity than, for example, an electrode film formed from a wet PVDF slurry process. Electrodes formed from such densified films may have reduced power performance due to both the low ion conductivity of PTFE and the low porosity of the films themselves. Thus, ion transport to the active material site can be adversely impeded. The aforementioned limitations with PTFE as an electrode binder material may be exacerbated, for example, in electrodes formed from PTFE without the use of other binders, such as dry electrode processes that use PTFE without other binders.

Embodiments described herein include alternative binder materials for an electrode film that can reduce the aforementioned degradation drawbacks and irreversible loss in capacity inherent to using PTFE alone as an electrode binder, for example, in a dry electrode process. Some embodiments provide electrode binder material that can allow for electrochemical operations at low voltages with reduced or virtually no significant additional loss in energy. In some embodiments, a PTFE composite binder material is provided which includes both PTFE and other binder materials to mitigate the limitations of PTFE. In some embodiments, some or all of the PTFE can be replaced, for example by a polyolefin. Embodiments can provide electrode films with improved mechanical integrity and ionic conductivity. Some embodiments are employed in a dry electrode film process, to avoid the aforementioned costs inherent to the drying of electrode films in a wet electrode film process, while achieving similar electrochemical performances as those commonly derived from a PVDF wet slurry coating method. In some embodiments, fabrication processes for forming a cathode and/or electrode film comprising a binder composition described herein are provided. In some embodiments, a fabrication process or a portion of a fabrication process can be performed at room temperature or higher to facilitate formation of electrodes demonstrating desired electrical performances. In some embodiments, a fabrication process for forming a cathode electrode film comprising a binder composition described herein is provided. In some embodiments, the cathode electrode film fabrication process includes a jet-milling step to facilitate formation of a reduced-defect, or nearly defect-free electrode film using a dry fabrication process.

Other mechanical and electrical properties may also be considered when developing composite binder materials and processes used to form electrodes. For example, the ductility and/or porosity of a binder material may be selected to provide improved mechanical integrity and/or ionic conductivity for an electrode. In some embodiments, a binder material may be selected to provide a resulting electrode film having desirable electrical properties, while also demonstrating desired interaction with one or more other components of the device, such as the electrolyte, and/or providing desired effectiveness as a binder material.

It will be understood that although the electrodes and energy storage devices herein may be described within a context of lithium ion batteries or lithium ion capacitors, the embodiments can be implemented with any of a number of energy storage devices and systems, such as one or more batteries, capacitors, fuel cells and the like, and combinations thereof.

The amount of binder as a percentage of the total weight of the electrode films described herein is for illustrative purposes only. In some embodiments, a preferred binder concentration range as a percent of the total weight of the film is approximately 1 to 20. A more preferred concentration range as a percent of the total weight of the film is approximately 4 to 10. As used herein, composition of the electrode films and/or electrode film mixtures, when expressed as a % relative to each other, are defined as weight %, unless indicated otherwise. As used herein, ratios of components of the electrode films and/or electrode film mixtures, when expressed as a ratio relative to each other, are defined as mass ratios, unless indicated otherwise.

It will be understood that the exact ratios and mixtures of materials described herein and used in the Examples are for illustrative purposes, and that other ratios and mixtures of materials are understood to be within the scope of the invention.

FIG. 1 shows a side cross-sectional schematic view of an example of an energy storage device 100. In some embodiments, the energy storage device 100 can be an electrochemical device. In some embodiments, the energy storage device 100 can be a lithium based battery, such as a lithium ion battery. In some embodiments, the energy storage device 100 can be a lithium based capacitor, such as a lithium ion capacitor. Of course, it should be realized that other energy storage devices are within the scope of the invention, and can include capacitor-battery hybrids, and/or fuel cells. The energy storage device 100 can have a first electrode 102, a second electrode 104, and a separator 106 positioned between the first electrode 102 and second electrode 104. For example, the first electrode 102 and the second electrode 104 may be placed adjacent to respective opposing surfaces of the separator 106.

The first electrode 102 may comprise a cathode and the second electrode 104 may comprise an anode, or vice versa. In some embodiments, the first electrode 102 may comprise a cathode of a lithium ion capacitor. In some embodiments, the first electrode 102 may comprise a cathode of a lithium ion capacitor or a cathode of a lithium ion battery. In some embodiments, the second electrode 104 may comprise an anode of a lithium ion battery or an anode of a lithium ion capacitor.

The energy storage device 100 may include an electrolyte to facilitate ionic communication between the electrodes 102, 104 of the energy storage device 100. For example, the electrolyte may be in contact with the first electrode 102, the second electrode 104 and the separator 106. The electrolyte, the first electrode 102, the second electrode 104, and the separator 106 may be received within an energy storage device housing 120. For example, the energy storage device housing 120 may be sealed subsequent to insertion of the first electrode 102, the second electrode 104 and the separator 106, and impregnation of the energy storage device 100 with the electrolyte, such that the first electrode 102, the second electrode 104, the separator 106, and the electrolyte may be physically sealed from an environment external to the housing 120.

The separator 106 can be configured to electrically insulate two electrodes adjacent to opposing sides of the separator 106, such as the first electrode 102 and the second electrode 104, while permitting ionic communication between the two adjacent electrodes. The separator 106 can comprise a variety of porous electrically insulating materials. In some embodiments, the separator 106 can comprise a polymeric material. Examples of separators include porous polyolefin films, porous cellulosic films, polyether films and/or polyurethane films.

The energy storage device 100 can include any of a number of different types of electrolyte. In some embodiments, device 100 can include a lithium ion battery electrolyte. In some embodiments, device 100 can include a lithium ion capacitor electrolyte. which can include a lithium source, such as a lithium salt, and a solvent, such as an organic solvent. In some embodiments, a lithium salt can include hexafluorophosphate ($LiPF_6$), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), combinations thereof, and/or the like. In some embodiments, a lithium ion capacitor and/or battery electrolyte solvent can include one or more ethers and/or esters. For example, a lithium ion capacitor electrolyte solvent may comprise ethylene carbonate (EC), dimethyl carbonate (DMC), diethyl carbonate (DEC), ethyl methyl carbonate (EMC), vinyl carbonate (VC), propylene carbonate (PC), combinations thereof, and/or the like.

As shown in FIG. 1, the first electrode 102 and the second electrode 104 include a first current collector 108, and a second current collector 110, respectively. The first current collector 108 and the second current collector 110 may facilitate electrical coupling between the corresponding electrode and an external circuit (not shown). The first current collector 108 and/or the second current collector 110 can comprise one or more electrically conductive materials, and/or have various shapes and/or sizes configured to facilitate transfer of electrical charges between the corresponding electrode and a terminal for coupling the energy storage device 100 with an external terminal, including an external electrical circuit. For example, a current collector can include a metallic material, such as a material comprising aluminum, nickel, copper, silver, alloys thereof, and/or the like. For example, the first current collector 108 and/or the second current collector 110 can comprise an aluminum foil having a rectangular or substantially rectangular shape and can be dimensioned to provide desired transfer of electrical charges between the corresponding electrode and an external electrical circuit (e.g., via a current collector plate and/or another energy storage device component configured to provide electrical communication between the electrodes and the external electrical circuit).

The first electrode 102 may have a first electrode film 112 (e.g., an upper electrode film) on a first surface of the first current collector 108 (e.g., on a top surface of the first current collector 108) and a second electrode film 114 (e.g., a lower electrode film) on a second opposing surface of the first current collector 108 (e.g., on a bottom surface of the first current collector 108). Similarly, the second electrode 104 may have a first electrode film 116 (e.g., an upper electrode film) on a first surface of the second current collector 110 (e.g., on a top surface of the second current collector 110), and a second electrode film 118 on a second opposing surface of the second current collector 110 (e.g., on a bottom surface of the second current collector 110). For example, the first surface of the second current collector 110 may face the second surface of the first current collector 108, such that the separator 106 is adjacent to the second electrode film 114 of the first electrode 102 and the first electrode film 116 of the second electrode 104. The electrode films 112, 114, 116 and/or 118 can have a variety of suitable shapes, sizes, and/or thicknesses. For example, the electrode films can have a thickness of about 60 microns (µm) to about 1,000 microns, including about 80 microns to about 150 microns.

In some embodiments, one or more electrode films described herein can be fabricated using a dry fabrication process. As used herein, a dry fabrication process can refer to a process in which no or substantially no solvents are used in the formation of an electrode film. For example, components of the electrode film may comprise dry particles. The dry particles for forming the electrode film may be combined to provide a dry particles electrode film mixture. In some embodiments, the electrode film may be formed from the dry particles electrode film mixture using the dry fabrication process such that weight percentages of the components of the electrode film and weight percentages of the components of the dry particles electrode film mixture are similar or the same. A dry method for preparing an electrode can include mixing the active material, conductive additive and/or the binder material, and subsequently calendaring the mixture to form a free-standing film. In some embodiments, the free standing film may be attached to a current collector, such as through a lamination process.

As described herein, some embodiments include an electrode, such as an anode and/or a cathode, having one or more electrode films comprising an electrochemically stable binder material. In some embodiments, the binder material may comprise one or more polyolefins. In some embodiments, the one or more polyolefins can include polyethylene (PE), polypropylene (PP), polyvinylidene fluoride (PVDF), co-polymers thereof, and/or mixtures thereof. In some embodiments, an electrode film comprising a binder material including one or more polyolefins can be fabricated using a dry process. For example, an electrode film may comprise interpenetrating networks of the aforementioned polymers.

In some embodiments, a polyolefin-containing binder can be used without additional binders. For example, the binder may be a polyolefin binder. As used herein, a polyolefin binder refers to binder which consists or consists essentially of one or more polyolefins and/or co-polymers thereof. For example, PTFE may be replaced by the one or more polyolefins and/or co-polymers thereof. In some embodiments, the binder material may consist or consist essentially of PE. In some embodiments, the binder material may consist or consist essentially of PP.

In some embodiments, the binder may comprise PTFE and one or more additional binder components. For example, the binder may comprise a PTFE composite binder material. Some embodiments include an electrode, including an anode and/or a cathode, comprising an electrochemically stable PTFE composite binder material. In some embodiments, a PTFE composite binder material may comprise one or more polyolefins and/or co-polymers thereof, and PTFE. In some embodiments, the binder material may comprise a PTFE composite material including PTFE and one or more of a polyolefin, polyether, precursor of polyether, polysiloxane, polysiloxane, co-polymer thereof, and/or the like. In some embodiments, a PTFE composite binder material can include branched polyethers, polyvinylethers, co-polymers thereof, and/or the like. In some embodiments, a PTFE composite binder material can include co-polymers of polysiloxanes and polysiloxane, and/or co-polymers of polyether precursors. For example, a PTFE composite can include poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, combinations thereof, and/or the like. In some embodiments, a PTFE composite binder material can include PVDF and/or PEO.

In some embodiments, an electrode film of a cathode of a lithium ion capacitor and/or lithium ion battery can comprise a porous carbon material, an active material, a conductive additive, and/or a binder material, the binder material comprising one or more compositions described herein, such as the PTFE composite binder material. In some embodiments, the conductive additive may comprise a conductive carbon additive, such as carbon black. In some embodiments, the porous carbon material may comprise activated carbon. In some embodiments, an active material for a cathode of a lithium ion battery can include a lithium metal oxide and/or a lithium sulfide. In some embodiments, active material for a lithium ion battery cathode may include lithium nickel manganese cobalt oxide (NMC), lithium manganese oxide (LMO), lithium iron phosphate (LFP), lithium cobalt oxide (LCO), and/or lithium nickel cobalt aluminum oxide (NCA). In some embodiments, an active material a lithium ion capacitor cathode can include a lithium metal oxide and/or a lithium metal phosphate.

In some embodiments, a cathode electrode film of a lithium ion capacitor and/or lithium ion battery anode can include about 70 weight % to about 95 weight % of the active material, including about 70 weight % to about 92 weight %, or about 70 weight % to about 88 weight %. In some embodiments, the cathode electrode film can comprise up to about 10 weight % of the porous carbon material, including up to about 5 weight %, or about 1 weight % to about 5 weight %. In some embodiments, the cathode electrode film comprises up to about 5 weight %, including about 1 weight % to about 3 weight %, of the conductive additive. In some embodiments, the cathode electrode film comprises up to about 20 weight % of the binder material, including about 1 weight % to 20 weight %, about 2 weight % to 10 weight %, or about 5 weight % to 10 weight %.

In some embodiments, an anode electrode film of a lithium ion battery and/or lithium ion capacitor may comprise an active material, a conductive additive, and/or a binder material, the binder material comprising one or more compositions described herein. In some embodiments, the conductive additive may comprise a conductive carbon additive, such as carbon black. In some embodiments, the active material of the anode may comprise synthetic graphite, natural graphite, hard carbon, soft carbon, graphene, mesoporous carbon, silicon, silicon oxides, tin, tin oxides, germanium, lithium titanate, mixtures or composites of the aforementioned materials, and/or other materials known or described herein. In some embodiments, an anode electrode film of a lithium ion capacitor and/or a lithium ion battery can include about 80 weight % to about 94 weight % of the active material, including about 80 weight % to about 92 weight %, or about 80 weight % to about 90 weight %. In some embodiments, the anode electrode film comprises up to about 5 weight %, including about 1 weight % to about 3 weight %, of the conductive additive. In some embodiments, the anode electrode film comprises up to about 20 weight % of a binder material having one or more compositions described herein, including about 1 weight % to 20 weight %, about 2 weight % to 10 weight %, or about 5 weight % to 10 weight %. In some embodiments, the anode film may not include a conductive additive.

A PTFE composite binder material may include various suitable ratios of the components of the composite binder. For example, the PTFE of a PTFE composite binder material can be up to about 98 weight % of the composite binder material, including from about 20 weight % to about 95 weight %, about 20 weight % to about 90 weight %, including about 20 weight % to about 80 weight %, about 30 weight % to about 70 weight %, or about 30 weight % to about 50 weight %. In some embodiments, a PTFE composite binder material for an anode electrode film may include PTFE and one or more non-PTFE components at a mass ratio of about 1:3 to about 3:1. For example, a PTFE composite binder material for an anode electrode film may comprise PTFE and PVDF at a mass ratio of about 1:1. For example, a PTFE composite binder material for an anode electrode film may comprise PTFE and PVDF co-polymer at a mass ratio of about 1:1. For example, a PTFE composite binder material for an anode electrode film may comprise PTFE and PEO at a mass ratio of about 1:1. In some embodiments, a PTFE composite binder material for a cathode electrode film may include PTFE and one or more non-PTFE components at a mass ratio of about 1:5 to about 5:1. In some embodiments, a PTFE composite binder material for a cathode electrode film may comprise PTFE and PVDF, or PTFE and a PVDF co-polymer, at a mass ratio of about 3:2.

In some embodiments, a polyolefin-containing binder can reduce one or more of the aforementioned problems with PTFE binders, such as binders consisting of or essentially of PTFE. For example, as will be described further below, a polyolefin-containing binder employed within an electrode film can have a lower irreversible capacity loss than a similar film comprising only a PTFE binder. Additionally, the mechanical and thermal properties of polyolefin-containing binder materials can allow them to be easier to compress than a binder made solely of PTFE. For example, it has been observed that compressing PTFE binder and active material without other binders in a dry electrode process may take ten passes through a calender roll at a given temperature and pressure to reach a target film thickness ranging between about 80 micrometers (μm) and about 130 micrometers. Compressing a binder consisting or consisting essentially of both PE and PVDF binder and similar active material can take three passes through a similar calender roll under similar conditions to reach a similar target film thickness.

As described herein, in some embodiments, PTFE may be replaced by a polyolefin, such as PE, for example in a polyolefin binder. Without being limited by any particular theory or mode of operation, the instability of PTFE at low voltages may be due to the low energy level of its molecular orbitals. The energy level of the lowest unoccupied molecular orbital (LUMO) of PTFE is relatively lower than that of PVDF or PE, such as in a polyolefin binder. The energy level of the LUMO of PTFE may also be relatively lower than that of a non-PTFE binder in a PTFE composite binder material, for example due to full fluorination of the polymer carbon backbone. At low operating potential, the charge may be more favorably transferred into the LUMO of PTFE to ultimately generate lithium fluoride and polyenes species through a defluorination process. By replacing some or all of the PTFE in a binder, with, for example, PE, which has a higher energy LUMO, or adding another non-PTFE binder, the resulting binder can be less susceptible to the charge transfer process. As a result, there may be little to no loss in capacity due to the binder participation in the electrochemical processes, as demonstrated in one or more examples described herein. The small amount of remaining irreversible capacity loss for electrodes can stem from the formation of the solid electrolyte interphase in the first lithiation cycle.

As described herein, in some embodiments, a binder can comprise a PTFE composite material. For example, the binder can comprise PTFE and PEO, PVDF, and/or a PVDF co-polymer. Without being limited by any particular theory or mode of operation, PEO, PVDF and/or the PVDF co-polymer may reduce direct contact between PTFE and one or more electron conducting materials in an electrode, for example, providing an electrical barrier between PTFE and electron conducting materials. PEO, PVDF and/or the PVDF co-polymer may demonstrate desirable low temperature flow characteristic, facilitating coating of electron conductors by the PEO, PVDF and/or the PVDF co-polymer. Coating of electron conductors may significantly reduce and/or prevent or substantially prevent charge transfer to PTFE. In some embodiments, PEO, PVDF and/or the PVDF co-polymer may be soluble and/or swellable in an organic solvent of the electrochemical device electrolyte. Such solubility and/or swellability may facilitate movement of PEO, PVDF and/or the PVDF co-polymer between PTFE and electron conductors to significantly reduce and/or prevent or substantially prevent charge transfer to PTFE. In some embodiments, inclusion of PEO, PVDF and/or the PVDF co-polymer in a binder for an electrode can significantly reduce, and/or prevent or substantially prevent electron transfer from an active material, such as graphite, to PTFE. In some embodiments, such electron transfer can be reduced or prevented while intercalation and de-intercalation processes of the electrochemical device, such as a lithium ion battery and/or lithium ion capacitor, is maintained. For example, PEO, PVDF and/or the PVDF co-polymer can provide desired lithium ion conductivity. In some embodiments, use of a binder comprising a PTFE composite material allows use of PTFE in electrodes while facilitating reduced energy loss during operation of the device.

Some embodiments described herein provide higher ion conducting binders that can be mixed with active material and compressed into an electrode film with lower porosity while still providing similar power performance as electrodes prepared from PTFE with high porosity, or from wet PE/PVDF slurry processes. For example, some embodiments include an electrode comprising an electrochemically stable binder material or materials system comprising linear polyurethanes, polyethers, polyamides, polycarbonates, branched polyethers, co-polymers comprising a combination of at least two monomers of urethanes, ethers, amides, and carbonates, block co-polymers comprising a combination of two monomers of urethanes, ethers, amides, and carbonates and grafted ethers and polyethers on the aforementioned polymers, co-polymers, and block co-polymers. Examples are polyether block amide materials commercially available from Arkema under the trade name Pebax®. Another example is an ether terminated Pebax® polymer chain in which terminal hydroxyl groups are alkylated, for example, using methylation chemistry. Additional examples are polyurethane elastomers, such as those offered by Lubrizol under the trade name Pellethane® and polyurethane-polyether block co-polymers. It will be understood that these other binder materials and blends can be combined with PTFE or other binders and additives known or described herein, or can be used without additional binders and additives. These alternative binder materials can also reduce the aforementioned degradation drawbacks and irreversible loss in capacity inherent to using PTFE as an electrode binder. Some embodiments can provide electrode films with improved mechanical integrity and ionic conductivity.

Figure 2:
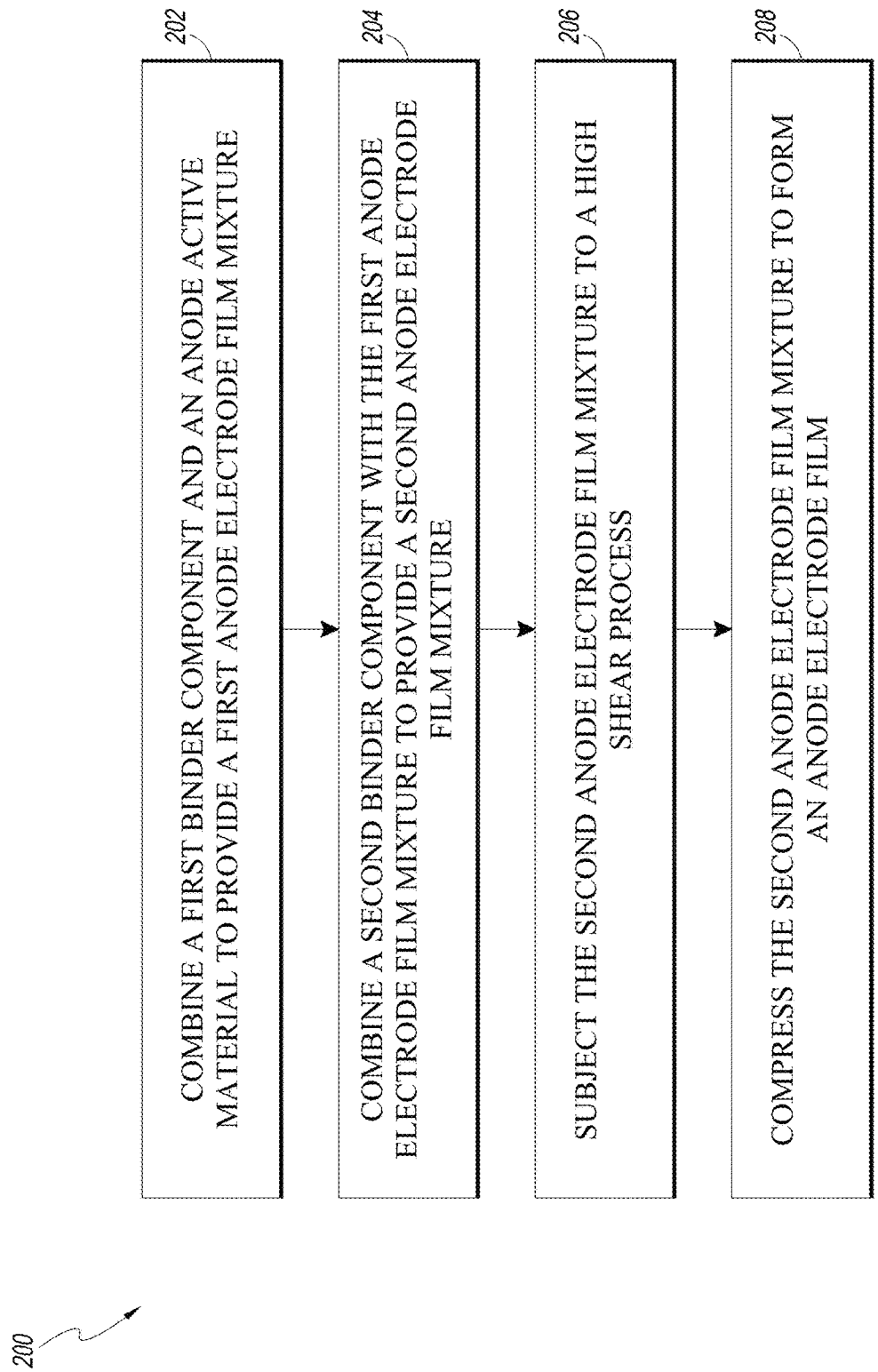
FIG. 2 shows an example of a process for fabricating an anode of an energy storage device.

FIG. 2 shows an example of a process 200 for fabricating an electrode film for an energy storage device anode of an energy storage device, such as the energy storage device 100 of FIG. 1. The electrode film fabrication process 200 may comprise a dry fabrication process. In some embodiments, the electrode film fabrication process 200 can be used for fabricating an anode of a lithium ion battery. In some embodiments, the electrode film fabrication process 200 can be used for fabricating an anode of a lithium ion capacitor. In some embodiments, the electrode film fabrication process 200 can be used to form an anode electrode film comprising a PTFE binder composite binder material having one or more compositions described herein. For example, an anode electrode film having about 93 weight % graphite, about 3.5 weight % PVDF and about 3.5 weight % PTFE may be fabricated according to the anode electrode film fabrication process 200. In some embodiments, the electrode film fabrication process 200 can be used to form an anode electrode film which includes a binder comprising only a single binder component.

In block 202, a first binder component and an anode active material can be combined to form a first anode electrode film mixture. For example, the first binder component and the anode active material may be combined such that the first binder component and the anode active material can be intermixed. In some embodiments, the first binder component and the anode active material can be combined to disperse the first binder component within the anode active material. In some embodiments, the first anode electrode film mixture can be provided by combining the first binder component and anode active material using a lower shear process. For example, the lower shear process can include blending, such as by using a blade type blender. In some embodiments, the lower shear mixing process can be achieved using a Waring® blender. In some embodiments, the lower shear mixing process can be achieved using a Cyclomix™ blender. For example, the first binder component and anode active material may be blended to provide the first anode electrode film mixture.

In some embodiments, the first binder component can comprise a non-fibrillizable binder material. In some embodiments, the first binder component may comprise a thermoplastic material, including a semi-crystalline thermoplastic material. In some embodiments, the first binder component may comprise a meltable adhesive. In some embodiments, the first binder component may comprise a polyolefin. In some embodiments, the first binder component may be PVDF. In some embodiments, the first binder component may be PE. In some embodiments, the anode active material may comprise a lithium ion intercalating carbon component. For example, the anode active material may comprise graphite. For example, PVDF and graphite may be blended to provide the first anode electrode film mixture. In some embodiments, initial unblended PVDF powder, such as PVDF powder available from commercial sources, may have secondary particles, the secondary particles comprising aggregates of smaller primary particles. For example, the secondary particles may comprise aggregates of a plurality of primary particles having a size orders of magnitude smaller than the secondary particles. Combining the PVDF with the anode active material using the lower shear process may initiate reduction in size and/or breaking apart of the secondary particles, thereby facilitating dispersion of the PVDF within the graphite.

In some embodiments, the first binder component and anode active material may be combined at room temperature (e.g., about 20° C. to about 25° C.) or higher. For example, cooling may not be applied during combining of the first binder component and the anode active material. In some embodiments, the first binder component and anode active material can be combined at about room temperature up to a temperature just below a melting temperature of the binder component. For example, the combination may be performed at temperatures of about 20° C. to about 75° C., about 20° C. to about 50° C., or about 25° C. to about 50° C. As described herein, the first binder component may comprise PVDF. For example, PVDF may having a melting temperature of about 140° C. to about 170° C. In some embodiments, PVDF and the anode active material, such as graphite, can be mixed at a temperature of about 20° C. to less than 140° C., including about 20° C. to about 75° C., or about 25° C. to about 75° C., or about 20° C. to about 50° C. In some embodiments, combining the first binder component and anode active material at temperatures around room temperature to a temperature just below a melting temperature of the first binder component may provide improved irreversible first cycle capacity loss performance for the resulting electrode, for example as compared to electrodes formed by a process in which the combination is performed at lower temperatures, such as below room temperature.

In some embodiments, the first anode electrode film mixture may include a conductive additive. For example, a conductive additive, such as a conductive carbon additive, may be combined with the first binder component and the anode active material to provide the first anode electrode film mixture. In some embodiments, the PVDF, graphite and carbon black can be blended to provide the first anode electrode film mixture. In some embodiments, the PVDF, graphite and carbon black may be combined, such as by blending, at a temperature of about 20° C. to about 75° C., including about 20° C. to about 50° C., to provide the first anode electrode film mixture.

As described herein, the binder may include more than one component. For example, the anode electrode film fabrication process 200 may be used to fabricate a composite binder material. In such embodiments, a second binder component may be added (combined) with the first anode electrode film mixture to provide a second anode electrode film mixture in block 204. In some embodiments, the second binder component may comprise a fibrillizable binder component. In some embodiments, the second fibrillizable binder component may comprise PTFE, for example the binder of the anode electrode film comprising a PTFE composite binder material. In such embodiments, block 202 can comprise combining an active material with at least one component of a PTFE composite binder material, to which PTFE is later combined to form the PTFE composite binder material. In some embodiments, the second binder component, such as PTFE, may be combined with the first anode electrode film mixture using a lower shear process, such as a lower hear mixing process. In some embodiments, combining the second binder component with the first anode electrode film mixture may be effected using a blender, including a paddle-type blender. In some embodiments, the lower shear mixing process can be achieved using a Waring® blender. In some embodiments, the lower shear mixing process can be achieved using a Cyclomix™ blender.

In some embodiments, adding the second binder component with the first anode electrode film mixture may comprise at least partially fibrillizing the second binder component. For example, the second binder component and the first anode electrode film mixture may be combined by blending to provide a mixture comprising a plurality of fibrils formed from the fibrillized second binder component. A matrix, lattice and/or web of fibrils may be formed by fibrillization of the second binder component to provide desired structural support for one or more other components of the mixture.

In some embodiments, the second binder component may be combined with the first anode electrode film mixture at ambient conditions without cooling. For example, blending of the second binder component with the first anode electrode film mixture may be performed at about room temperature or higher, for example at a temperature of about 20° C. to about 75° C., or about 20° C. to about 50° C. For example, PTFE may be blended with the first anode electrode film mixture comprising graphite, PVDF, and/or carbon black, at a temperature of about 20° C. to about 75° C. In some embodiments, combining the second binder component and first anode electrode film mixture at around room temperature or higher may provide improved irreversible first cycle capacity loss performance for the resulting electrode, for example as compared to electrodes formed by performing the combination at lower temperatures.

In block 206, the second anode electrode film mixture can be subjected to a high shear process. In some embodiments, the high shear process can be configured to further disperse the first binder component, while reducing or avoiding undesired heat generation during the high shear process. For example, the high shear process may be configured to further reduce and/or break apart any secondary particle aggregates present in the first binder component and/or further disperse the first binder component. For example, excessive heat generation may result in undesired melting of the first binder component.

In some embodiments, the high shear process may fibrillize the second binder component. For example, PTFE may be fibrillized by the high shear process. As described herein, a matrix, lattice and/or web of fibrils may be formed by fibrillization of the second binder component. In some embodiments, combining of the second binder component with the first anode electrode film mixture (e.g., block 204) may at least partially fibrillize the second binder component and the high shear process may further fibrillize the second binder component.

In some embodiments, the high shear process can comprise a jet-milling process. For example, the jet-milling process may provide desired interaction between particles of the first binder component, particles of the anode active material (e.g., provide desired contact between the particles of the binder component and the anode active material), and/or second binder component, while reducing or avoiding excessive heat generation. In some embodiments, the second anode electrode film mixture can be subjected to the jet-milling process to provide a homogeneous or substantially homogeneous mixture comprising a plurality of fibrils. For example, the jet-milling may disperse any remaining secondary particles of the first binder component and/or provide desired fibrillization of the second binder component.

In block 208, the second anode electrode film mixture may be compressed to form an anode electrode film. In some embodiments, the second anode electrode film mixture may be compressed by calendering the mixture to form the electrode film. In some embodiments, the second anode electrode film mixture may be calendered to form a free-standing dry particles electrode film. In some embodiments, the electrode film may be attached, such as through a lamination process, to a corresponding current collector to form an electrode. For example, the electrode film may be laminated to the first current collector 108 or the second current collector 110 of FIG. 1. In some embodiments, compressing the second anode electrode film mixture to form a free-standing film can be performed at a temperature sufficient to melt a meltable binder component, such as PVDF. For example, compressing the electrode film mixture to form a free-standing electrode film can be performed at temperatures higher than about 140° C., including about 140° C. to about 300° C., or about 140° C. to about 200° C. In some embodiments, the free-standing electrode film can be laminated to a current collector in the same step or in separate steps. In some embodiments, lamination of a free-standing electrode film to a current collector can be performed at temperatures of about 100° C. to about 200° C., or about 160° C. to about 200° C.

As described herein, in some embodiments, processes of fabricating a cathode electrode film are provided. One or more cathode fabrication processes described herein provides cathodes having electrode films free or substantially free of undesired holes or voids, surface pitting and/or dark streaks, are provided. In some embodiments, one or more processes of fabricating a cathode electrode film described herein comprises a high shear process, such as a jet-milling process. In some embodiments, a process for fabricating a cathode electrode film includes jet-milling one or more binder components in the presence of a porous carbon material to facilitate formation of the cathode electrode film free or substantially free of undesired defects. For example, a porous carbon material can be jet-milled with a binder component to provide a mixture having desired particles dispersion characteristics, where the mixture can be further processed to form the electrode film by adding one or more other components of the electrode film to the mixture. In some embodiments, such a fabrication process facilitates fabrication of a defect free cathode electrode film while avoiding subjecting an active material of the cathode to the jet-milling process (e.g., avoiding exposing NMC to the jet-milling process). Subjecting the active material to the jet-milling process may result in undesired alteration of one or more electrochemical properties of the active material. In some embodiments, exposing a cathode active material to high shear processing, such as jet-milling, may provide mixtures which can be difficult to form into electrode films of desired thickness. For example, such film mixtures may demonstrate an undesirable tendency to densify during a calendaring process used to form the electrode films. One or more cathode electrode film fabrication processes described herein can facilitate formation of the cathode electrodes using dry processes, thereby avoiding a drying step, while also providing films having desired quality and/or processability.

Figure 3:
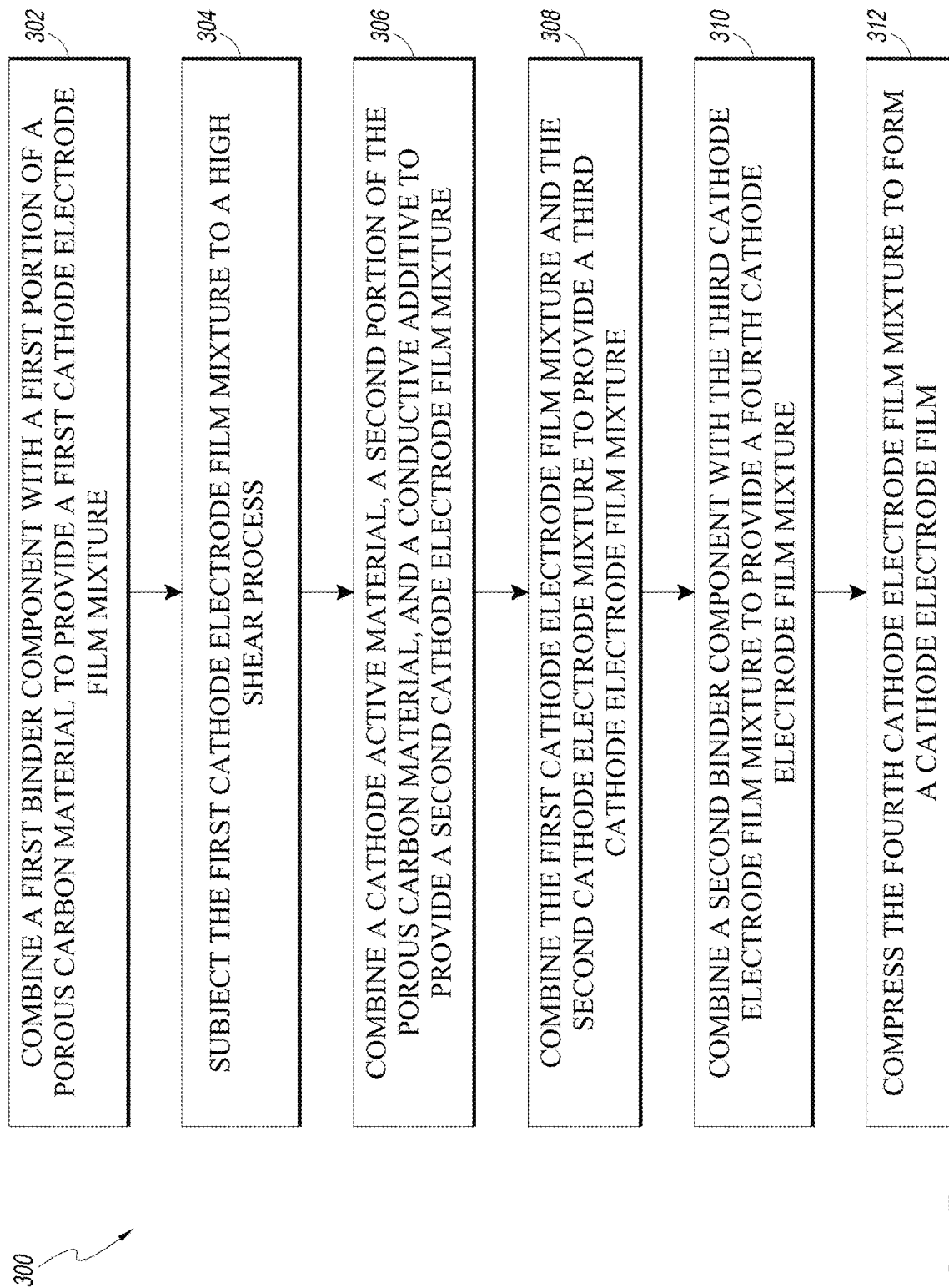
FIG. 3 shows an example of a process for fabricating a cathode of an energy storage device.

FIG. 3 shows an example of a fabrication process 300 for forming a cathode electrode film of an energy storage device, such as the energy storage device of FIG. 1. In some embodiments, the cathode electrode film fabrication process 300 can be used for fabricating a cathode of a lithium ion battery. In some embodiments, the cathode electrode film fabrication process 300 can be used for fabricating a cathode of a lithium ion capacitor. In some embodiments, the cathode electrode film fabrication process 300 forms a cathode electrode film comprising a composite binder material.

In block 302, a first binder component and a first portion of a porous carbon material may be combined to provide a first cathode electrode film mixture. In some embodiments, the first binder component and the first portion of the porous carbon material may be combined using a lower shear process. In some embodiments, the lower shear process may comprise any number of lower shear homogenization techniques. For example, combining the first binder component and the porous carbon material may be effected using a blender, including a v-blender and/or a kitchen blender.

In some embodiments, the first binder component can comprise a non-fibrillizable binder material. In some embodiments, the first binder component may comprise a thermoplastic material, including a semi-crystalline thermoplastic material. For example, the first binder component may be a meltable adhesive. In some embodiments, the first binder component may comprise a polyolefin. For example, the first fibrillizable binder component may comprise PVDF. In some embodiments, the porous carbon material may comprise activated carbon. For example, in block 302, PVDF and activated carbon may be mixed to provide the first cathode electrode film mixture.

In some embodiments, the first binder component and the first portion of the porous carbon material may be blended at a mass ratio of about 1:1 to about 1:5, about 1:1 to about 1:4, or about 1:1 to about 1:3. For example, PVDF and activated carbon may be combined in block 302 with a mass ratio of about 1:2.

In some embodiments, the mass ratio of the first binder component to the porous carbon material may be selected to provide desired contact between the two. For example, the mass ratio of PVDF to activated carbon may be selected to provide desired collision between particles of the two during combining of the two in block 302, and/or during a subsequent high shear process, as will be described in further details below.

In some embodiments, combining the first binder component and the cathode active material may be performed at ambient conditions without cooling. For example, combining of the first binder component with the cathode active material may be performed at about room temperature or higher, for example at a temperature of about 20° C. to about 75° C., or about 20° C. to about 50° C.

In block 304, the first cathode electrode film mixture can be subjected to a high shear process. In some embodiments, the high-shear process can be configured to further disperse the first binder component in the porous carbon material, while reducing or avoiding undesired heat generation during the high shear process. As described herein, the first binder component may comprise PVDF. In some embodiments, PVDF powder available from a commercial source may comprise undesired secondary particles which are aggregates of smaller primary particles. In some embodiments, the high shear process may be configured to reduce in size and/or break apart secondary particle aggregates present in the first binder component. For example, the high shear process may break apart the secondary particles to further disperse the primary particles of the first binder component within the porous carbon material. In some embodiments, the high shear process may be configured to provide a reversible homogeneous or substantially homogeneous dispersion of the first binder component within the porous carbon material, without generating excessing heat. For example, excessive heat generation may result in melting of the first binder component, reducing or preventing reversible dispersion of the first binder component within the porous carbon material.

In some embodiments, the high shear process can comprise a jet-milling process. For example, the jet-milling process may provide the desired interaction between particles of the first binder component and particles of the porous carbon material (e.g., provide desired contact between the particles of the binder component and the porous carbon material), while reducing or avoiding excessive heat generation. In some embodiments, the first cathode electrode film mixture can be subjected to the jet-milling process to provide a homogeneous or substantially homogeneous mixture. For example, the first cathode electrode film mixture comprising the first binder component, such as the PVDF, and the porous carbon material, such as activated carbon, may be jet-milled to provide a homogeneous or substantially homogeneous mixture. In some embodiments, jet-milling the first cathode electrode film mixture facilitates formation of a powder mixture free or substantially free of undesired large particle aggregates. In some embodiments, powder mixtures free or substantially free of such large particle aggregates may facilitate formation of an electrode film free of holes or voids, surface pitting and/or dark streaks.

In some embodiments, the mass ratio of the first binder component and the porous carbon material may be selected to effect desired interaction, such as collision, between the two during the high shear process to provide desired dispersion of the binder component within the porous carbon material. For example, a mass ratio of the first binder component and the porous carbon material of between about 1:1 to about 1:5 may be selected to reduce a duration of the high shear process. In some embodiments, such ratios may facilitate providing desired particles dispersion while providing an efficient high shear process (e.g., reducing a duration of a high shear process). In some embodiments, a mass ratio of the first binder component to the porous carbon material other than about 1:1 to about 1:5 may also be possible. For example, mixtures having such ratios can be processed by applying a longer high shear process, such as a longer jet-milling process.

In block 306, a cathode active material, a second portion of the porous carbon material, and a conductive additive may be combined to provide a second cathode electrode film mixture. In some embodiments, the cathode active material, the second portion of the porous carbon material, and the conductive additive may be combined using a lower shear process. In some embodiments, the lower shear mixing process may comprise blending. For example, combining the cathode active material, the second portion of the porous carbon material, and the conductive additive may be effected using a blender, such as a paddle type blender. In some embodiments, the blender may comprise a Waring® blender. In some embodiments, the blender may comprise a Cyclomix™ blender.

In some embodiments, the cathode active material comprises a non-carbon active material. In some embodiments, the cathode active material may comprise lithium nickel manganese cobalt oxide (NMC), lithium manganese oxide (LMO), or lithium iron phosphate (LFP). For example, NMC, a second portion of activated carbon, and carbon black may be blended to provide a homogenous or substantially homogeneous second cathode electrode film mixture. In some embodiments, the distribution of activated carbon between the first portion and the second portion may be selected to provide desired carbon to binder mass ratio in the high shear process, while providing desired porous carbon material for the electrode film.

In some embodiments, the second cathode electrode film mixture may be mixed until a desired tap density is achieved. For example, the second cathode electrode film mixture may be mixed to achieve a tap density value similar to or the same as a tap density value of the component within the mixture with the highest initial tap density. For example, NMC may have the highest initial tap density in a mixture comprising NMC, activated carbon and/or carbon black, such as at a value of about 2 grams per milliliter (g/mL). In some embodiments, a mixture comprising NMC, activated carbon and carbon black may be blended until a tap density of about 2 g/mL is achieved for the mixture. In some embodiments, a mixture having a desired final tap density may demonstrate a desired degree of dispersion of components within the mixture. In some embodiments, a mixture demonstrate a desired degree of particles dispersion may facilitate formation of an electrode at a desired thickness using fewer calendering passes.

In block 308, the first cathode electrode film mixture and the second cathode electrode mixture may be combined to provide a third cathode electrode film mixture. In some embodiments, the first cathode electrode film mixture and the second cathode electrode mixture may be combined using one or more lower shear processes described herein. For example, combining the first cathode electrode film mixture and the second cathode electrode film mixture may be achieved using a blender, such as a paddle type blender. In some embodiments, the blender may comprise a Waring® blender. In some embodiments, the blender may comprise a Cyclomix™ blender.

In block 310, a second binder component and the third cathode electrode film mixture can be combined to provide a fourth cathode electrode film mixture. In some embodiments, the second binder component comprises a fibrillizable binder component. In some embodiments, the second fibrillizable binder component comprises PTFE. In such embodiments, block 302 described above, can comprise combining a porous carbon material with at least one component of a PTFE composite binder material, to which PTFE is later added, as part of block 310, to form the PTFE composite binder material. For example, PTFE can be added to a third cathode electrode film mixture comprising activated carbon, NMC, PVDF and carbon black, such that a cathode electrode film comprising a PTFE composite binder material can be formed. In some embodiments, combining the second binder component with the third cathode electrode film mixture may comprise fibrillizing the second binder component. For example, the second binder component and the third cathode electrode film mixture may be combined by using one or more lower shear processes, such as blending, to provide a mixture comprising a plurality of fibrils formed from the fibrillized second binder component. For example, a matrix, lattice and/or web of fibrils may be formed by fibrillization of the second binder component to provide desired structural support for one or more other components of the mixture. In some embodiments, blending can include use of a paddle type blender. In some embodiments, the blender may comprise a Waring® blender. In some embodiments, the blender may comprise a Cyclomix™ blender. In some embodiments, use of a lower shear fibrillization process in block 310 may advantageously provide fibrillization of the second binder component while reducing or avoiding exposure of the cathode active material to high shear processing.

In block 312, the fourth cathode electrode film mixture can be compressed to form a cathode electrode film. In some embodiments, the fourth cathode electrode film mixture may be compressed by calendering the mixture to form the electrode film. In some embodiments, the fourth cathode electrode film mixture may be calendered to form a free-standing dry particles cathode electrode film. In some embodiments, the electrode film may be attached, such as through a lamination process, to a corresponding current collector to form a cathode, such as to the first current collector 108 or the second current collector 110 of FIG. 1.

If some embodiments, compressing the cathode electrode film mixture to form a free-standing film can be performed at a temperature sufficient to melt a metable binder component, such as PVDF. For example, compressing the electrode film mixture to form a free-standing electrode film can be performed at temperatures higher than about 140° C., including about 140° C. to about 300° C., or about 140° C. to about 200° C. In some embodiments, the electrode film can be laminated to a current collector in the same step or in separate steps. In some embodiments, lamination of an electrode film to a current collector can be achieved with temperatures of about 100° C. to about 200° C., or about 160° C. to 200° C.

Example 1

Figure 4:
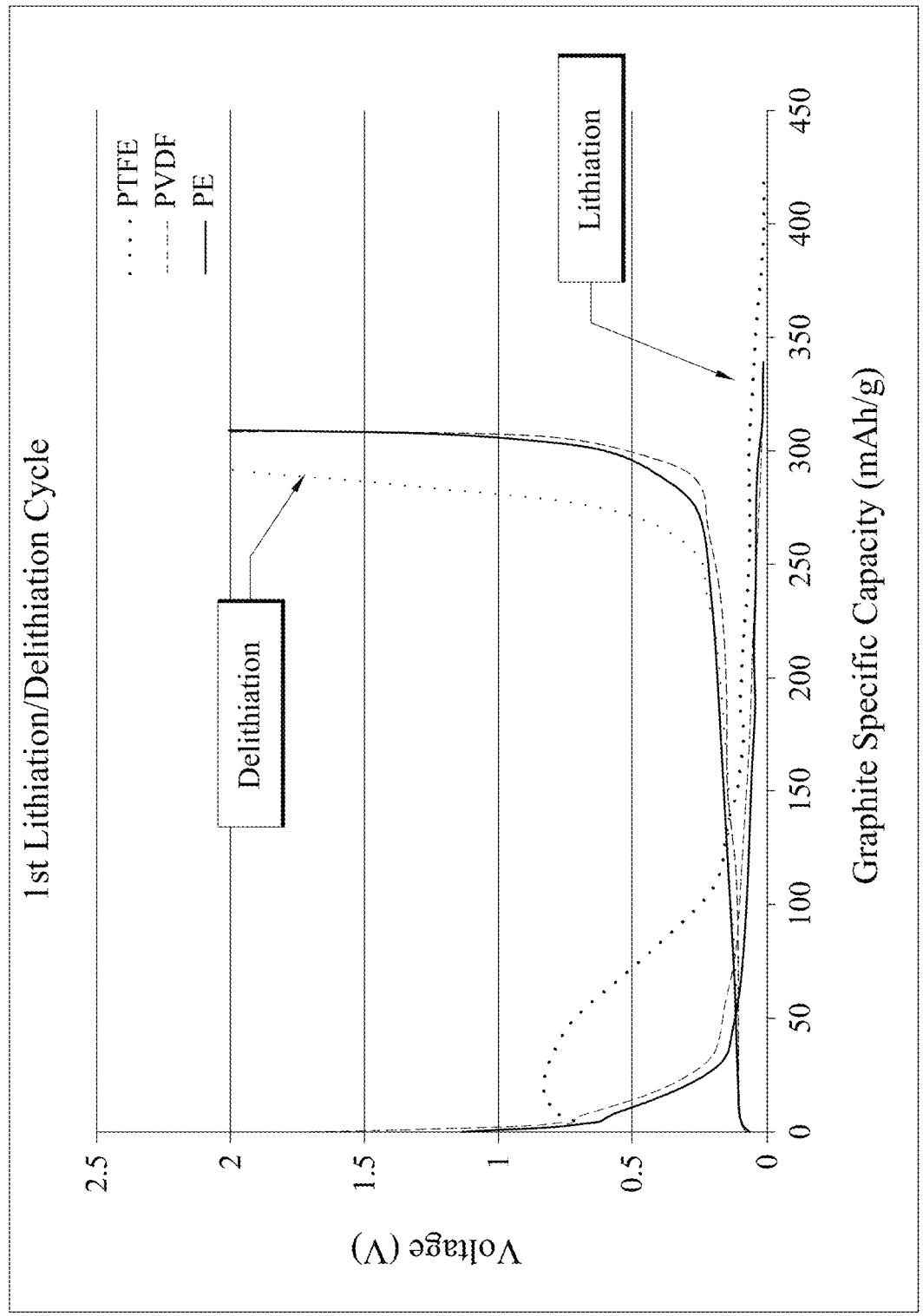
FIG. 4 shows specific capacity performances during first cycle lithiation and delithiation of examples of energy storage device half-cells including anodes according to some embodiments.

FIG. 4 shows specific capacity performances of three lithium ion battery half-cells during a first cycle lithiation and delithiation. Each half-cell included an anode comprising a binder composition as shown in FIG. 4. The performance is shown as a function of the electrode voltage, expressed in Volts (V) on the y-axis, versus the graphite specific capacity of the corresponding anode during charge and discharge of each cell, expressed in milliampere-hour per gram (mAh/g), is shown on the x-axis. The first set of three curves sloping upwards to the right indicates the delithiation process, or discharge, of each cell. The second set of three curves sloping downwards to the right indicates the lithiation process, or charging of each cell. As shown in the figure, the anodes corresponding to the delithiation and lithiation curves of FIG. 4 include electrode films having binder which consists essentially of PTFE, PVDF or PE, respectively. The first cycle lithiation capacity for each anode corresponds to the point on the lithiation curves where the electrode voltage is approximately zero. The first cycle delithiation capacity for each electrode corresponds to the point on the delithiation curves where the voltage of the electrode is approximately 2 Volts. The irreversible capacity loss is the difference between these two numbers.

The anode made of the PE binder was formed using a dry fabrication process. The dry fabrication process was as follows: graphite (about 90 grams, for example G5 graphite powder available from Conoco Phillips), conductive carbon black additive (about 2 grams, for example Super P conductive carbon black available from Timcal) and polyethylene (about 8 grams, for example available from DuPont) were thoroughly mixed. The resulting powder was calendered into a free-standing anode electrode film. The electrode film was laminated onto a carbon coated copper foil to provide the anode. The anode made of the PTFE binder was prepared using a dry process similar to that used to fabricate the anode comprising the polyolefin binder. The anode made of the PVDF binder was prepared from a wet slurry coating. All three anodes were fabricated using an electrode film mixture comprising about 90 weight % graphite, about 2 weight % conductive carbon, and about 8 weight % of the binder.

A lithium ion battery half-cell was formed using each of the corresponding three anodes as follows: a polyolefin separator was placed on lithium metal (16 millimeter diameter punched from a 0.750 millimeter lithium metal ribbon, available from Sigma Aldrich), on which the aforementioned anode was placed to form an electrode stack. An electrolyte comprising about 1 molar (1M) lithium hexafluorophosphate ($LiPF_6$) in a solvent comprising ethylene carbonate (EC) and ethyl-methyl carbonate (EMC) at a ratio of about 3:7, was applied to the electrode stack and the combined electrode stack and electrolyte were sealed to form the lithium ion battery half-cell.

FIG. 5 provides a table summarizing the first cycle lithiation and delithiation specific capacity performances of the comparative anodes corresponding to the graphs shown in FIG. 4. As demonstrated by the results shown in FIG. 4 and the table shown in FIG. 5, the electrode made of PTFE binder formed using a dry process and graphite has a higher irreversible capacity loss (approximately 127 milliampere-hour per gram (mAh/g), based on the weight of graphite), than both the electrode made of polyethylene (PE) binder formed by a dry process and graphite (approximately 30 mAh/g, based on the weight of graphite), and the electrode formed from slurry-coated PVDF and graphite (approximately 23 mAh/g, based on the weight of the graphite). Accordingly, as shown in FIGS. 4 and 5, an anode with the polyethylene binder has the benefits of both being formed from a dry process, while providing a lower irreversible capacity loss during initial charge and discharge.

Example 2

Figure 6:
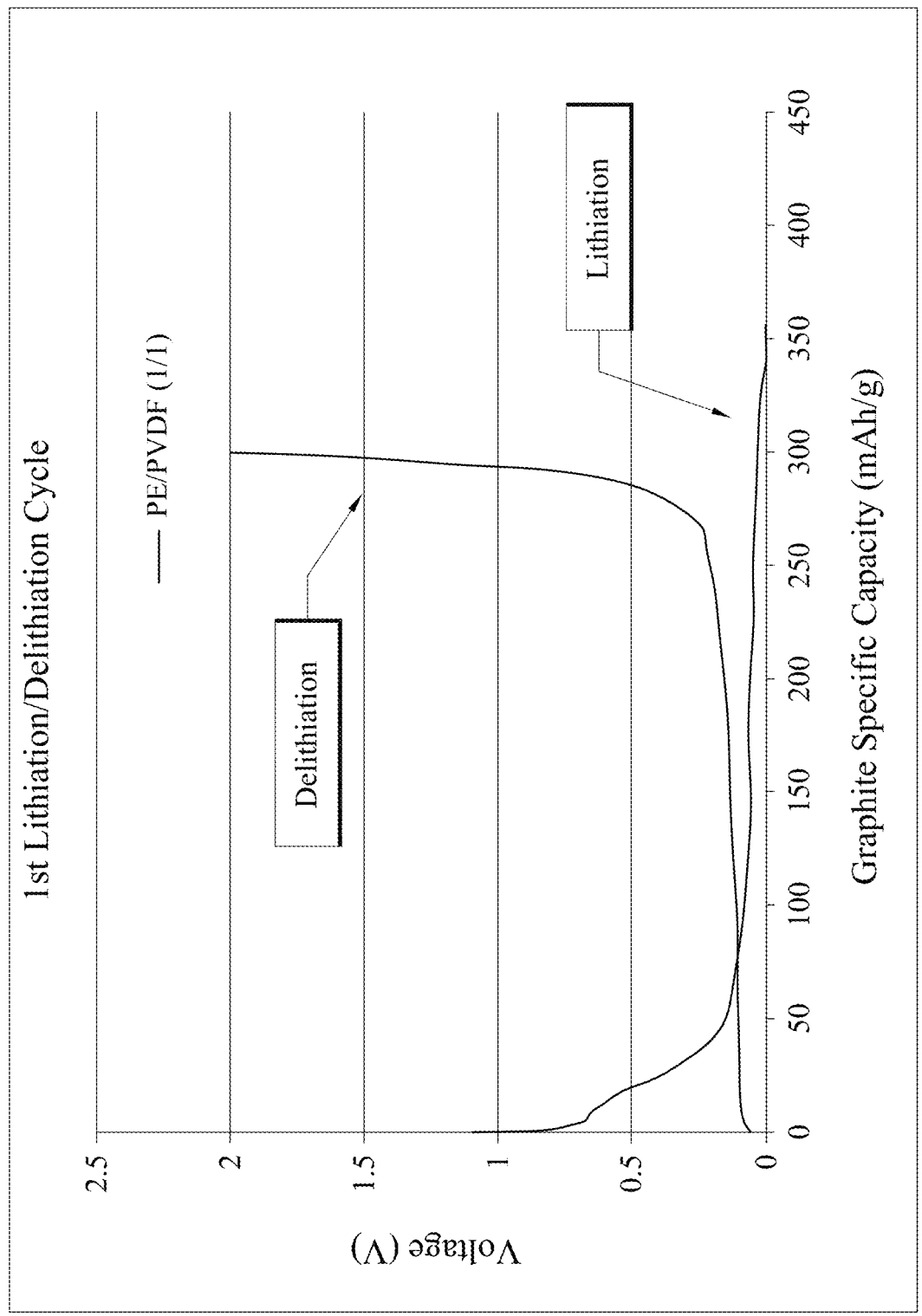
FIG. 6 shows specific capacity performances during lithiation and delithiation of an example of energy storage device half-cell including an anode according to an embodiment.

FIG. 6 shows half-cell specific capacity performance of a lithium ion battery anode during a first cycle lithiation and delithiation of the anode, according to another embodiment. Electrode voltage, expressed in Volts (V) is shown on the y-axis, and the graphite specific capacity of the corresponding anode during the initial charge and discharge of the anode, expressed in milliampere-hour per gram (mAh/g), is shown on the x-axis. The delithiation and lithiation curves of FIG. 6 correspond to a half-cell having an anode which includes a composite binder consisting essentially of PVDF and PE at a mass ratio of about 1:1. The anode was fabricated using about 90 weight % graphite, about 2 weight % conductive carbon, and about 8 weight % of the binder. The anode and half-cell corresponding to FIG. 6 were prepared using similar methods as those described above in Example 1 for the anode comprising the polyolefin-binder.

As shown in the first lithiation and delithiation cycle capacity performance of FIG. 6, the irreversible capacity loss was about 50 mAh/g based on the weight of graphite (about 90 weight % loading in the electrode). Referring to Example 1 and FIGS. 4 and 5, this irreversible capacity loss performance was comparable to that determined for the anodes described above using either PE binder or PVDF binder. The aforementioned results from Examples 1 and 2 indicate that anodes can be prepared using PE binder or mixed PE-based binder systems, such as a binder made of PE and PVDF, in a dry electrode fabrication technique, while achieving similar electrochemical performances as those commonly derived from a PVDF wet slurry coating method. Such systems reduce the aforementioned degradation and irreversible capacity loss inherent to many dry electrodes formed using only PTFE binder, while also avoiding the costs of drying inherent to a wet PVDF slurry method.

Example 3

Figure 7A:
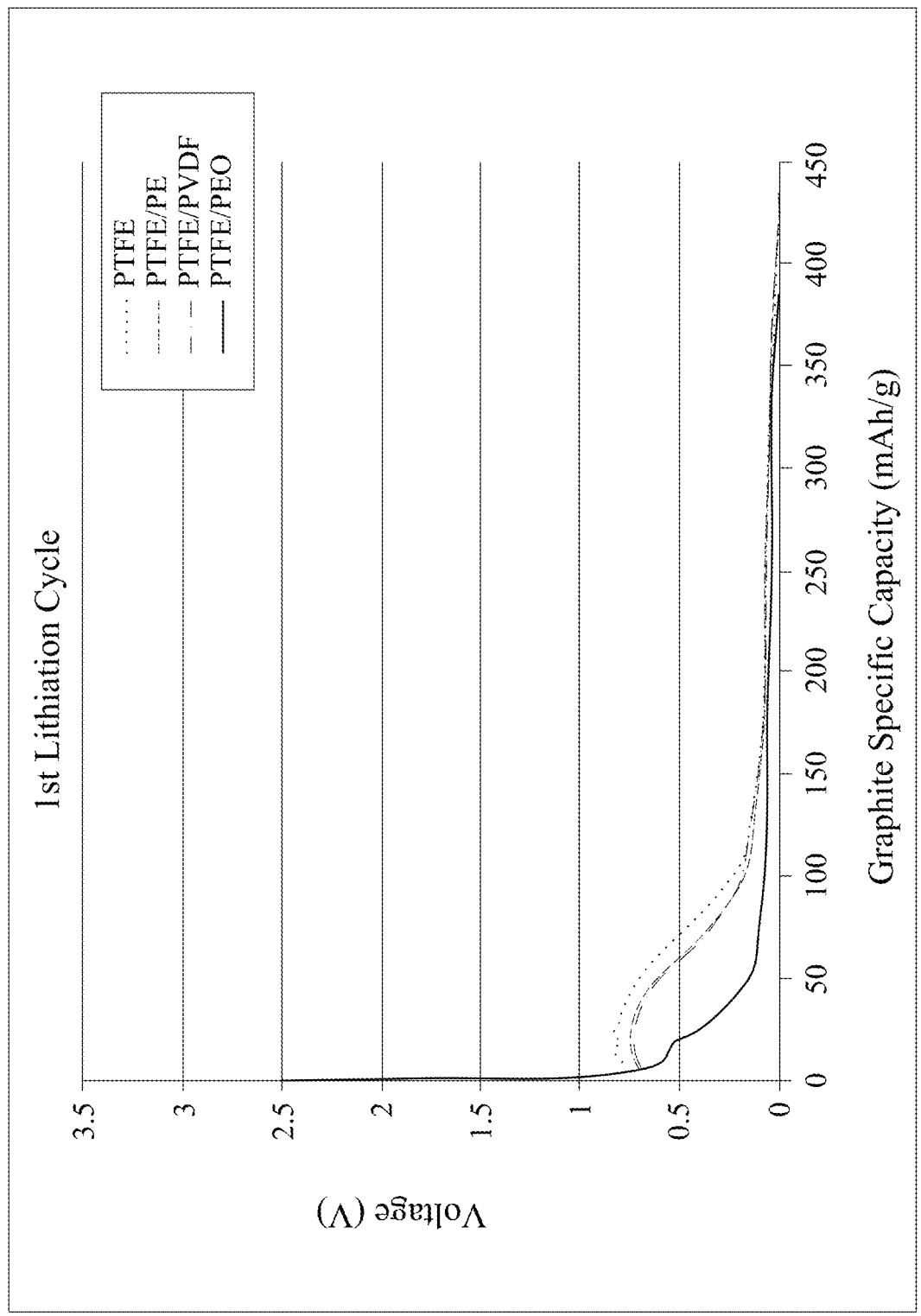
FIG. 7A shows specific capacity performances during lithiation of examples of energy storage device half-cells including anodes according to some embodiments.
Figure 7B:
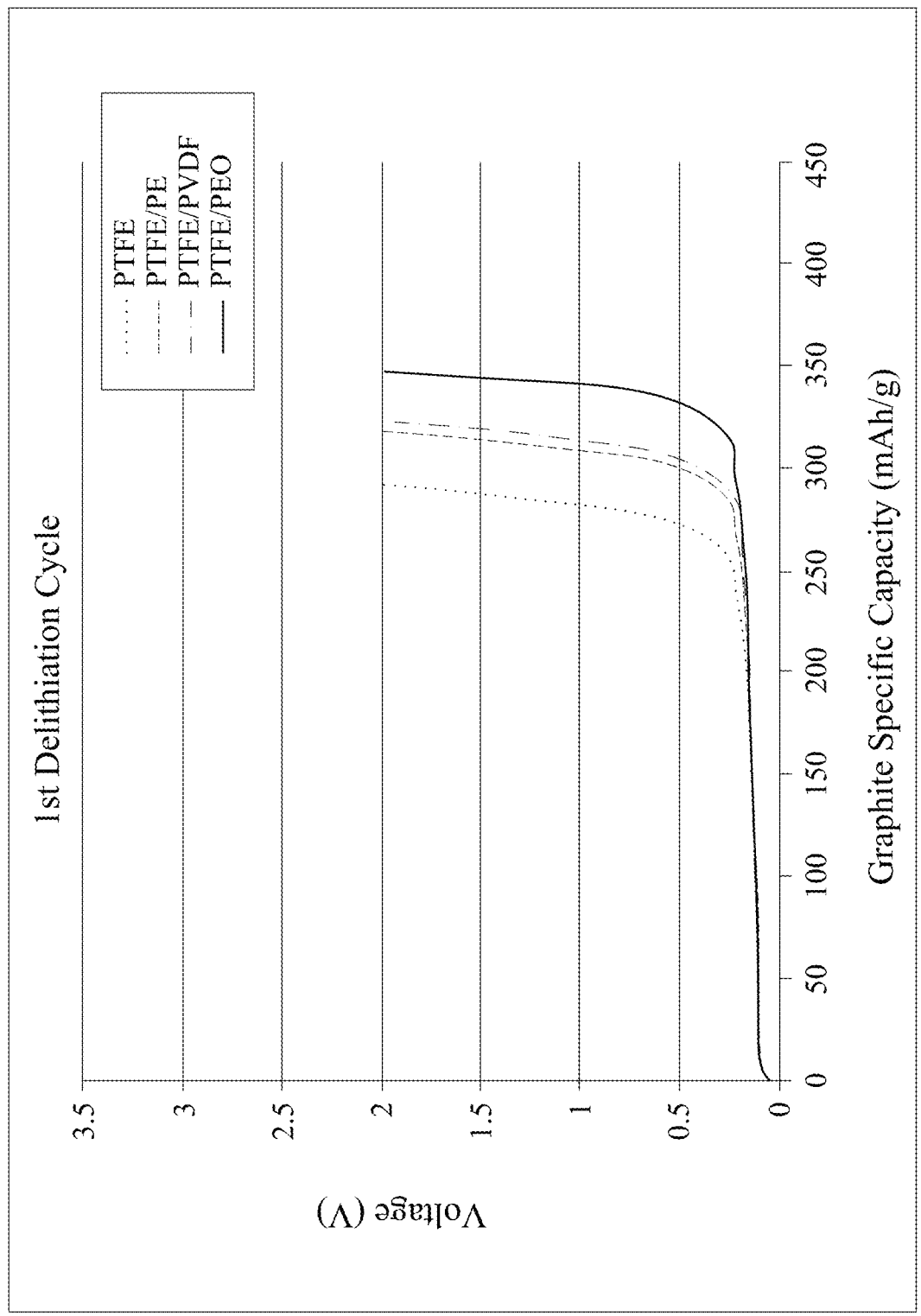
FIG. 7B shows specific capacity performances during delithiation of the half-cells of FIG. 7A.

FIGS. 7A through 7C show specific capacity performances during first lithiation and delithiation cycles of electrochemical half-cells including anodes made with binder consisting essentially of a PTFE binder, or a PTFE composite binder material consisting essentially of PTFE and the other material listed. As shown in these figures, half-cells including anodes each comprising one of three different PTFE composite binder materials are provided. The specific capacity performances during the first lithiation and delithiation cycles are shown in FIGS. 7A and 7B, respectively. The electrode voltage, expressed in Volts (V), is shown on the y-axis, and the graphite specific capacity during the initial charge and discharge of each cell, expressed in milliampere-hour per gram (mAh/g), is shown on the x-axis. In FIG. 7A, a set of curves sloping downwards to the right indicates the lithiation process, or charging of each cell, and in FIG. 7B, a set of curves sloping upwards to the right indicates the delithiation process, or discharge, of each cell. FIG. 7C is a table summarizing the irreversible capacity loss performances of the anodes based on the specific capacity performances of the respective anodes during the first lithiation and delithiation cycle shown in FIGS. 7A and 7B.

Anodes for each of the four half-cells were prepared using a PTFE binder only, or a PTFE composite binder material. FIGS. 7A and 7B show specific capacity performances of a first lithium ion battery half-cell including an anode having a PTFE binder only, a second lithium ion battery half-cell including an anode having a binder made of PTFE and polyethylene (PE) at a mass ratio of about 1:1, a third lithium ion battery half-cell, made of an anode having a binder comprising PTFE and polyvinylidene fluoride (PVDF) at a mass ratio of about 1:1, and a fourth lithium ion battery half-cell made of an anode having a binder comprising PTFE and poly(ethylene oxide) (PEO) at a mass ratio of about 1:1. Each of the four anodes were fabricated using about 92 weight % graphite, about 1 weight % of a conductive carbon additive, and about 7 weight % of a PTFE composite binder. The anodes were fabricated using the dry process described with reference to Example 1, and the half-cells were assembled using the process described with reference to Example 1. For example, about 92 grams (g) of graphite powder, about 1 gram of conductive carbon additive, about 3.5 grams of PTFE, and about 3.5 grams of polyethylene or polyvinylidene fluoride or poly(ethylene oxide), were thoroughly mixed, to provide an electrode film mixtures comprising a PTFE composite binder material.

Referring to FIGS. 7A through 7C, anodes prepared using PTFE composite binder materials can demonstrate reduced irreversible capacity loss after the first cycle lithiation and delithiation, as compared to the anode shown with binder consisting essentially of the PTFE binder. As shown in the table of FIG. 7C, an anode comprising PTFE and PEO can demonstrate a significantly reduced irreversible capacity loss after the first lithiation and delithiation cycles of the lithium-based cell, as compared to the anode comprising only the PTFE binder, and can exhibit an increased specific delithiation capacity.

Referring to FIG. 7A, the specific capacity during the first lithiation cycle for each of the graphite anodes made of PTFE binder, or PTFE composite binder including PTFE and PE, or PTFE and PVDF binder, showed a broad voltage rise under 1 Volt (V). Such a broad voltage rise may indicate degradation of PTFE. The anode made of the composite binder system using PTFE and PEO exhibited reduced voltage rise profile under 1 V in its first lithiation cycle, for example indicating occurrence of relatively less PTFE degradation.

Figure 8A:
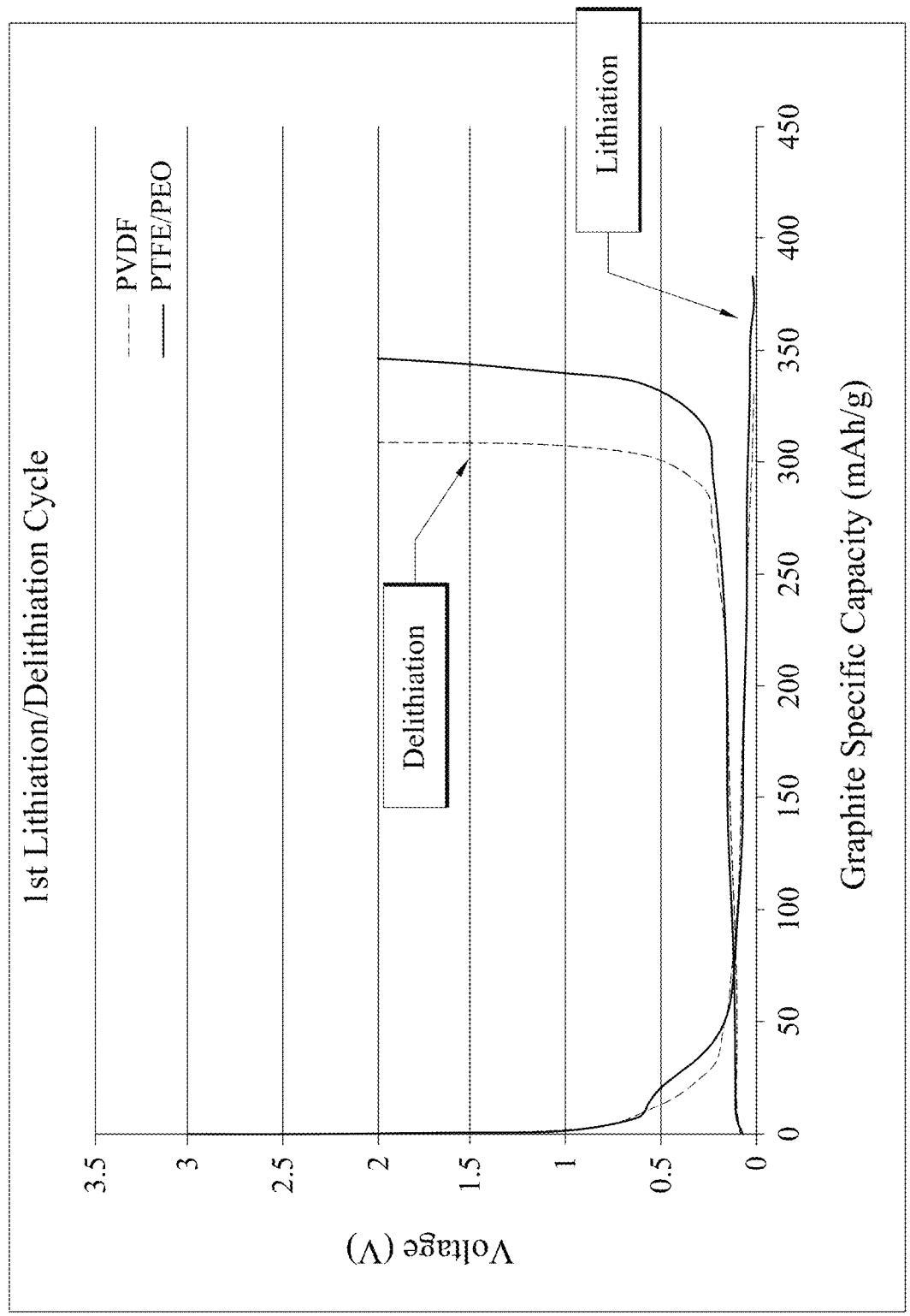
FIG. 8A shows specific capacity performance during lithiation and delithiation of an example of an energy storage device half-cell including an anode according to an embodiment.

FIGS. 8A and 8B compare specific capacity performances during first lithiation and delithiation cycles of an anode made of a PTFE composite binder including PTFE and PEO, with that of an anode made of a wet slurry coated PVDF binder system known in the art. The PTFE composite binder was formed from the PTFE and PEO at a mass ratio of about 1:1. The anode formed from the PTFE composite binder was fabricated using about 92 weight % graphite, about 1 weight % of a conductive carbon additive, and about 7 weight % of a PTFE composite binder, and used the dry process described with reference to Example 1. The half-cells for each of the anodes were assembled using the process described with reference to Example 1.

As shown in FIGS. 8A and 8B, the first lithiation and delithiation specific capacity performances of the anode formed from the PTFE and PEO binder system can be higher than that of an anode fabricated using a wet slurry coated PVDF, while demonstrating comparable irreversible specific capacity loss.

The aforementioned results from Example 3 indicate that electrodes can be prepared using PTFE composite binder systems in a dry electrode fabrication technique, while achieving similar or better electrochemical performances as those commonly derived from a PVDF wet slurry coating method. Such systems reduce the aforementioned degradation and irreversible capacity loss inherent to many dry electrodes formed using binder systems consisting essentially of PTFE, while also avoiding the costs of drying inherent to a wet PVDF slurry method.

Example 4

Figure 9:
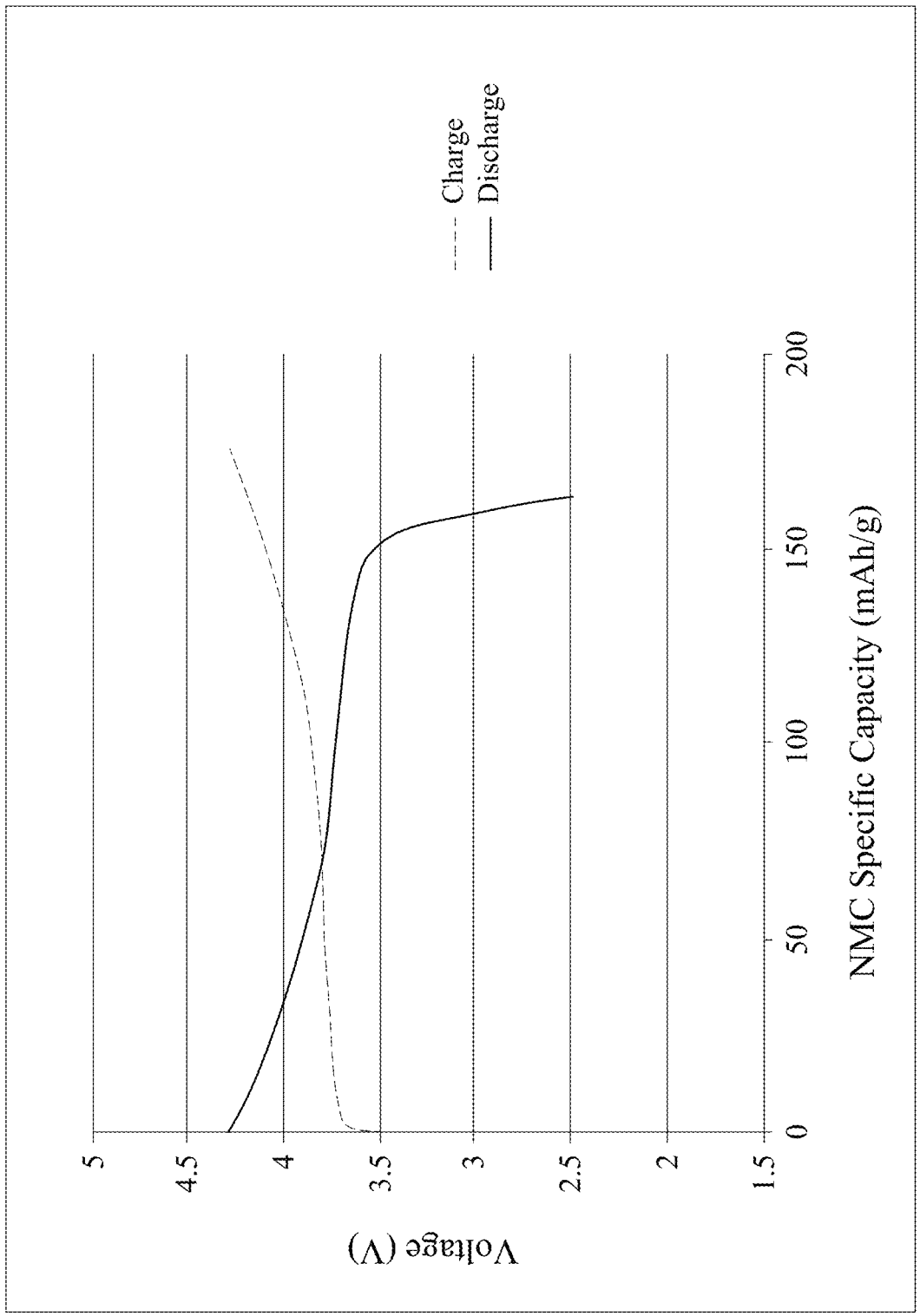
FIG. 9 shows specific capacity performances during lithiation and delithiation of an energy storage device half-cell including a cathode according to an embodiment.
Figure 10:
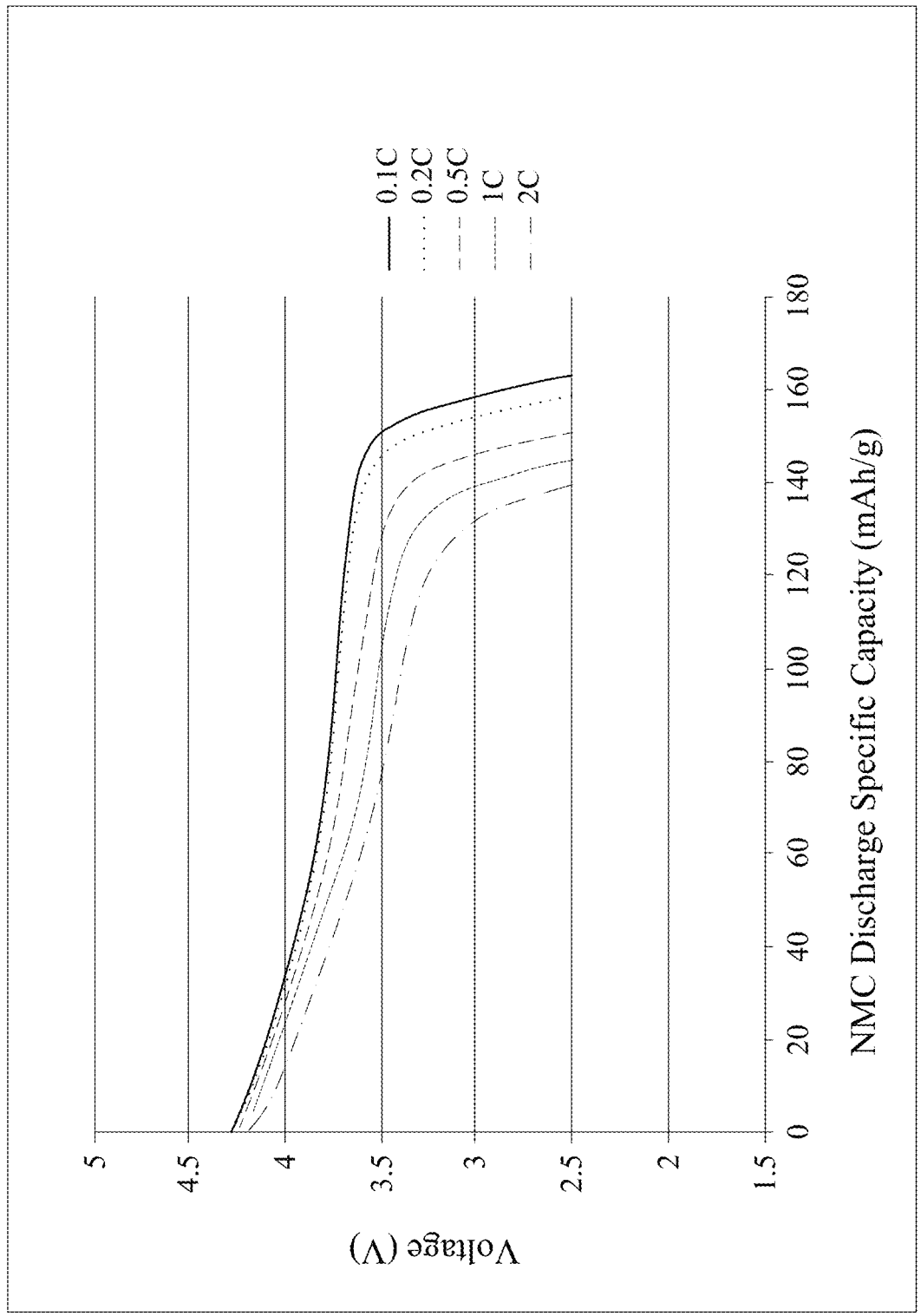
FIG. 10 shows specific capacity performances during delithiation at various discharge current rates of the energy storage device half-cell of FIG. 9.

FIG. 9 shows specific capacity performances during initial charge and discharge of a lithium ion battery half-cell including a cathode comprising a PTFE composite binder material. FIG. 10 shows the specific capacity performances during discharge of the lithium ion battery half-cell of FIG. 9 at various discharge current rates. FIGS. 9 and 10 show cathode voltage, expressed in Volts (V), on the y-axes, and NMC specific capacity, expressed in milliampere-hour per gram (mAh/g), on the x-axes. The discharge current rates of FIG. 10 are shown in C-rates, FIG. 10 showing the specific capacity performances during discharge at discharge current rates of about 0.1 C, about 0.2 C, about 0.5 C, about 1 C and about 2 C. The cathode of FIGS. 9 and 10 were fabricated using dry processes described herein, and comprised about 88 g of NMC (e.g., available from Umicore), about 5 g of activated carbon (e.g., YP80F available from Kuraray), about 2 g of carbon black Ketjenblack (e.g., ECP600JD available from Lion), about 2 g of PVDF (e.g., Kynar Flex 3121-50 available from Arkema) and about 3 g of PTFE (e.g., Teflon Type 60 available from DuPont).

As shown in FIG. 10, the specific capacity performance of the half-cells generally decreased with increased discharge current rate. The cathodes demonstrated desired discharge specific capacity, for example demonstrating discharge specific capacities at least comparable to that of cathodes fabricated using wet coating technology.

Example 5

FIGS. 11A through 15 show specific capacity performances during initial lithiation and delithiation of lithium-ion battery half-cells having anodes in which components of the respective anodes were combined under various temperatures. FIGS. 11A, 12A, 13A, 14A show anode voltage on the respective y-axis, expressed in Volts (V), and specific capacity on the respective x-axis based on weight of graphite in the corresponding anode, expressed in milliampere-hour per gram (mAh/g). FIGS. 11B, 12B, 13B and 14B are tables summarizing the specific charge capacity performance, in mAh/g, the specific discharge capacity performance, in mAh/g, and irreversible capacity loss % performance, of the half-cells shown in FIGS. 11A, 12A, 13A and 14A, respectively. FIG. 15 is a table which lists the processing conditions of the anodes corresponding to FIGS. 11 through 14, along with the corresponding average irreversible capacity loss % performance.

The anodes of the half-cells of FIGS. 11A through 14B were prepared using a dry fabrication process. The anodes were formed from electrode film mixtures comprising about 92 weight % graphite, about 1 weight % conductive carbon additive, and about 7 weight % binder. As discussed in further details herein, the binder comprised a PVDF binder, and/or a PTFE composite binder.

FIGS. 11A and 11B show specific capacity performances during lithiation and delithiation of half-cells including anodes comprising a PVDF binder. Components of the anode electrode film were combined, such as by blending, under ambient conditions (e.g., without cooling), and further processed by a jet-mill. For example, anodes of the half-cells corresponding to curves graphed in FIG. 11A included graphite, conductive carbon additive, and PVDF. A temperature of the mixture comprising the graphite, conductive carbon additive, and PVDF during blending was at about 50° C. to about 75° C. For example, the mixing container in which the anode components were blended was maintained at about 40° C. to about 50° C. Subsequently, the blended mixture was jet-milled. FIG. 11B shows a table summarizing the specific charge capacity performance and specific discharge capacity performance, in mAh/g, and irreversible capacity loss %, of each half-cell shown in FIG. 11A. For example, as shown in FIGS. 11A and 11B, an anode comprising a PVDF binder, where components of the anode electrode film mixture were combined under room temperature, can demonstrate an irreversible capacity loss % of about 18%.

Figure 12A:
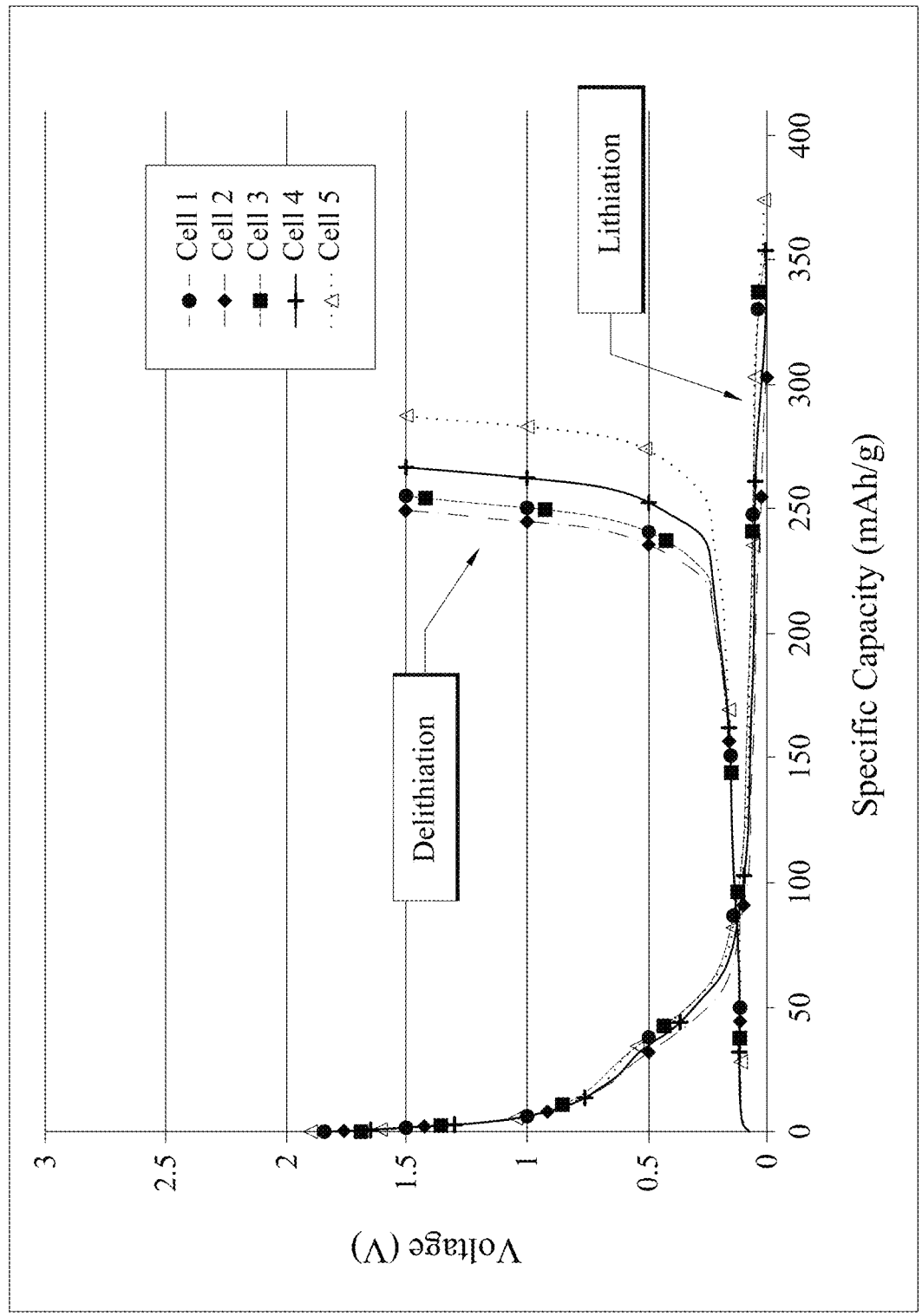
FIG. 12A shows specific capacity performances during lithiation and delithiation of examples of energy storage device half-cells.

FIGS. 12A and 12B show specific capacity performances during lithiation and delithiation of half-cells including anodes made with binder consisting essentially of PTFE. Components of the anode electrode films of FIGS. 12A and 12B were combined, such as by blending, under ambient conditions (e.g., without cooling), and further processed by a jet-mill. For example, anodes of the half-cells corresponding to curves graphed in FIG. 12A included graphite, conductive carbon additive, and PTFE. A temperature of the mixture comprising the graphite, conductive carbon additive and PTFE during blending was at about 50° C. to about 75° C. For example, the mixing container in which the anode components were blended was maintained at about 40° C. to about 50° C. Subsequently, the blended mixture was jet-milled. FIG. 12B is a table summarizing the specific charge capacity performance and specific discharge capacity performance, in mAh/g, and irreversible capacity loss %, of each half-cell shown in FIG. 12A. For example, as shown in FIGS. 12A and 12B, an anode made with binder consisting essentially of PTFE, where components of the anode electrode film mixture were combined under room temperature, can demonstrate an irreversible capacity loss % of about 23% to about 25%.

Figure 13A:
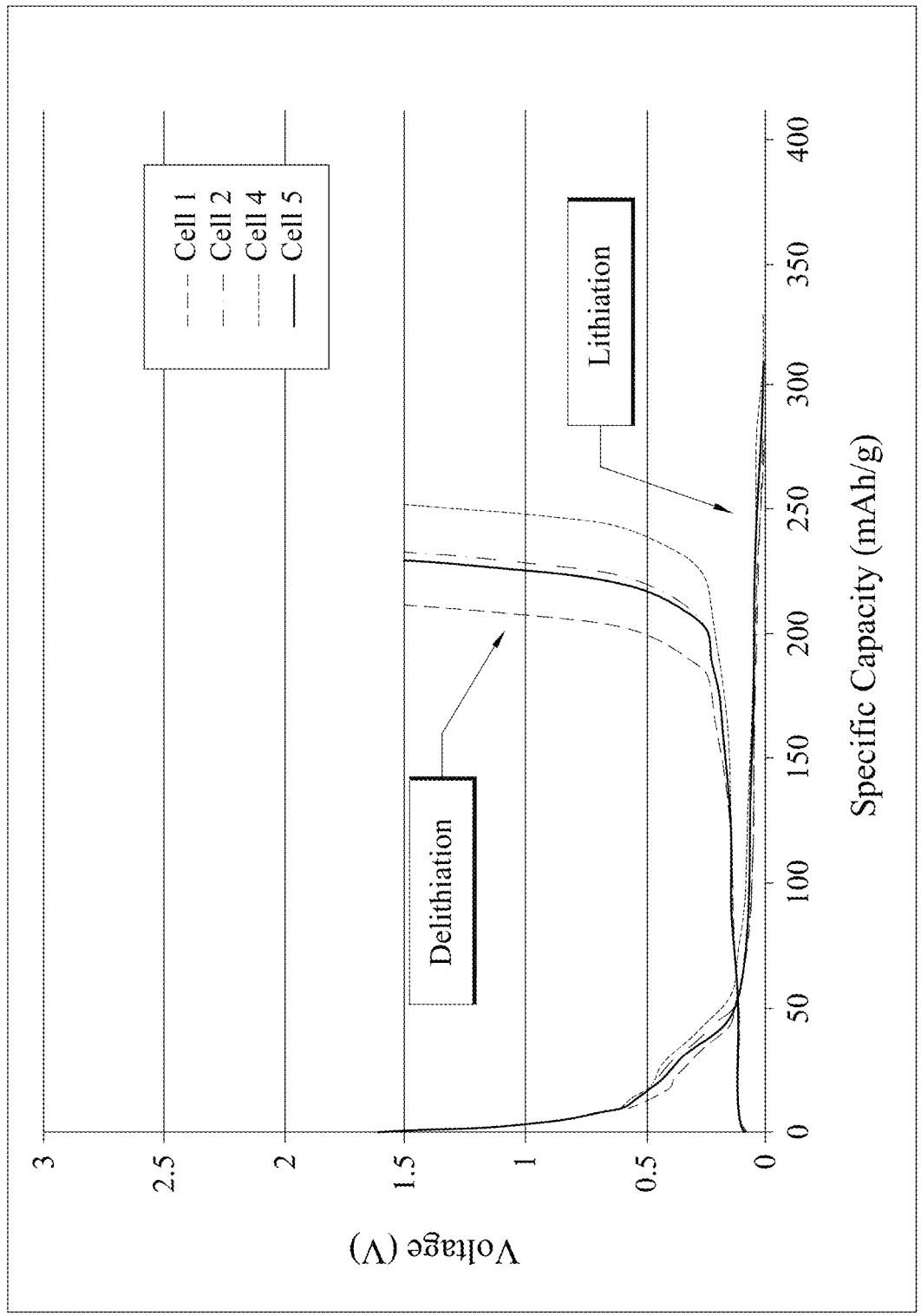
FIG. 13A shows specific capacity performances during lithiation and delithiation of examples of energy storage device half-cells.

FIGS. 13A and 13B show specific capacity performances during lithiation and delithiation of half-cells including anodes comprising a PTFE composite binder, where components of the electrode films were combined under reduced temperatures and further processed by a jet-mill. The anodes included a PTFE composite binder material comprising PTFE and PVDF at a mass ratio of about 1:1. For example, anodes corresponding to curves graphed in FIG. 13A include graphite, conductive carbon additive, PVDF and PTFE. The mixture comprising the graphite, conductive carbon additive, and PVDF during blending was at a temperature of about −196° C. to about 20° C. For example, a temperature of the mixing container was maintained using liquid nitrogen ($N_2$) cooling (e.g., liquid nitrogen having a temperature of about −196° C. to about 0° C., or about 77 K to about 273K). The binder, graphite, conductive carbon additive and PVDF were then jet-milled. Subsequently, the jet-milled mixture was blended at a temperature of about −196° C. to about 20° C. (about 77 K to about 293K) with PTFE. For example, a temperature of the mixing container was maintained using liquid nitrogen ($N_2$) cooling (e.g., liquid nitrogen having a temperature of about −196° C. to about 0° C., or about 77 K to about 273K).

FIG. 13B shows a table summarizing the specific charge capacity performance and specific discharge capacity performance, in mAh/g, and irreversible capacity loss %, of each half-cell shown in FIG. 13A. For example, as shown in FIGS. 13A and 13B, an anode comprising a PTFE composite binder, where components of the anode electrode film mixture were combined under reduced temperatures, can demonstrate an irreversible capacity loss % of about 23% to about 25%.

Figure 14A:
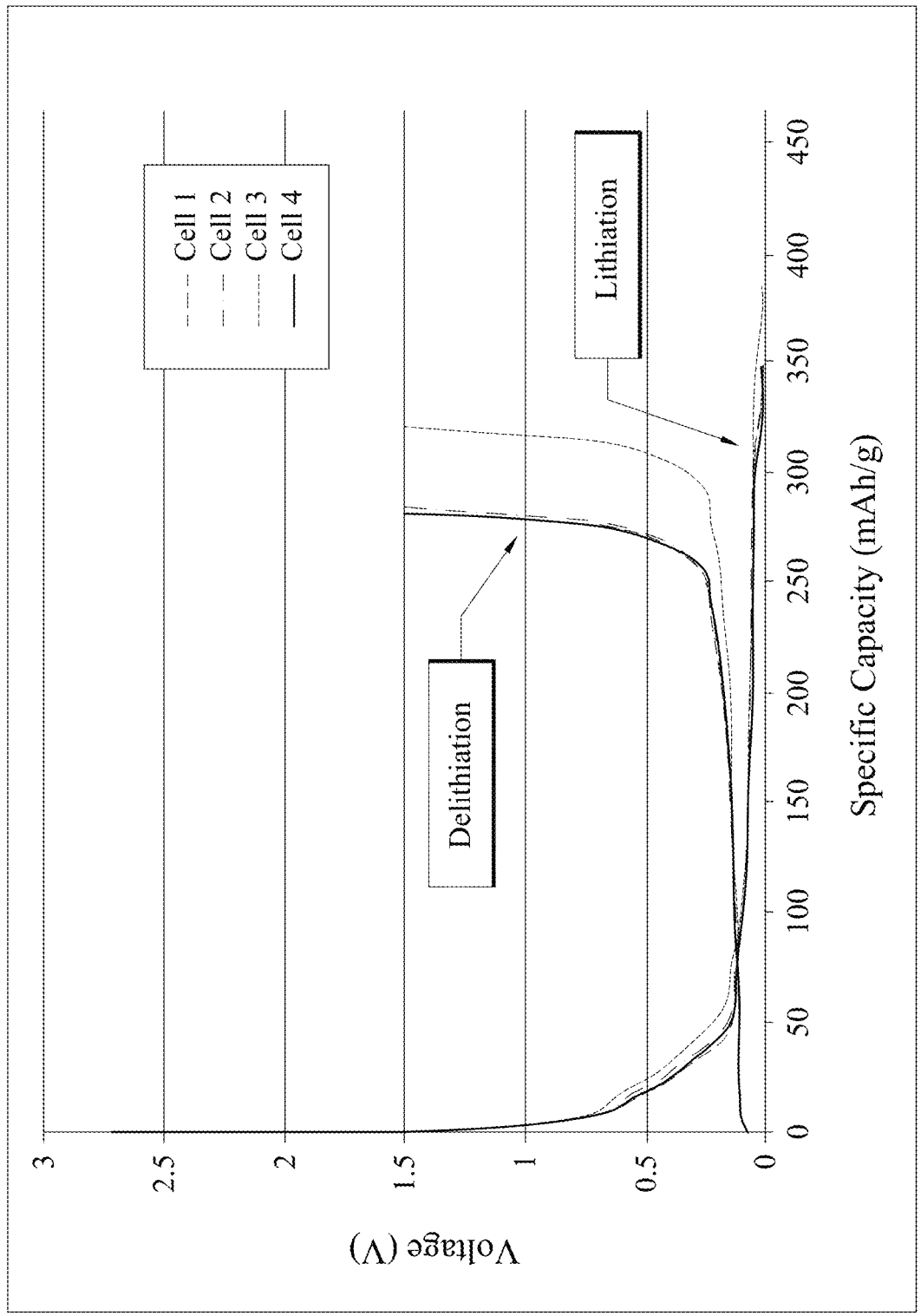
FIG. 14A shows specific capacity performances during lithiation and delithiation of examples of energy storage device half-cells.

FIGS. 14A and 14B show specific capacity performances during lithiation and delithiation of half-cells including anodes comprising a PTFE composite binder. Components of the electrode films of FIGS. 14A and 14B were combined, such as by blending, under ambient conditions (e.g., without cooling) and further processed by a jet-mill. The anodes included a PTFE composite binder material comprising PTFE and PVDF at a mass ratio of about 1:1. For example, anodes corresponding to curves graphed in FIG. 14A include graphite, conductive carbon additive, PVDF and PTFE. A temperature of the mixture comprising the graphite, conductive carbon additive, and PVDF during blending was at about 50° C. to about 75° C. For example, the mixing container in which the anode components are blended can be maintained at about 40° C. to about 50° C. Subsequently, the mixture comprising the graphite, conductive carbon additive and PVDF was jet-milled mixture was then blended at ambient temperatures with the PTFE. The jet-milled mixture was blended at a temperature of about 20° C. to about 75° C. For example, the mixing container in which the anode components are blended was maintained at about 40° C. to about 50° C., while the mixture comprising the anode components was at about 50° C. to about 75° C. FIG. 14B shows a table summarizing the specific charge capacity performance and specific discharge capacity performance, in mAh/g, and irreversible capacity loss %, of each half-cell shown in FIG. 14A. For example, as shown in FIGS. 14A and 14B, an anode comprising a PTFE composite binder including PTFE and PVDF, where components of the anode electrode film mixture were combined under room temperatures, can demonstrate an irreversible capacity loss % of about 16% to about 18%.

FIG. 15 is a table listing a summary of the specific capacity performances of anodes from FIGS. 11A through 14B. For example, as shown in FIG. 15, in some embodiments, an anode comprising PTFE and PVDF fabricated using a dry process where components of the anode are combined under room temperature can have an irreversible capacity loss similar to that of an anode comprising PVDF where components of the anode are combined under room temperature using a dry process. As shown in the table of FIG. 10, an anode comprising a PTFE composite binder including PTFE and PVDF at a mass ratio of about 1:1 where the anode components were combined under reduced temperatures (e.g., blending process cooled by liquid nitrogen), can have a first cycle irreversible capacity loss about 7% higher than anode of a similar formulation blended at room temperature.

In some embodiments, one or more parameters in a process of combining components of an anode can facilitate a reduced anode first cycle irreversible capacity loss. For example, an anode fabricated using a dry electrode fabrication technique and comprising a PTFE composite binder including PTFE and PVDF, where components of the anode are combined under room temperature, can demonstrate a reduction in an anode irreversible first cycle capacity loss, as compared to that of an anode having a similar formulation where components are combined at reduced temperatures. Without being limited by any particular theory or mode of operation, in some embodiments, PVDF can disrupt the direct physical contact between PTFE and graphite. The efficacy of this disruption can depend on processing temperature, for example, the efficacy can be increased when combination of the components are performed under room temperature as compared to when combined under reduced temperatures.

Example 6

A comparison of a cathode electrode film fabricated using a wet process and a cathode electrode film fabricated according to a process described herein is shown FIGS. 16 through 32. The cathode electrode films each included NMC, activated carbon, carbon black and a PTFE composite binder material. The cathode electrode films included NMC:activated carbon:carbon black:PVDF:PTFE at a mass ratio of about 88:5:2:2:3. Scanning electron microscopy (SEM) images were used to analyze physical size, morphology and/or dispersion efficiency of various powders.

Figure 16:
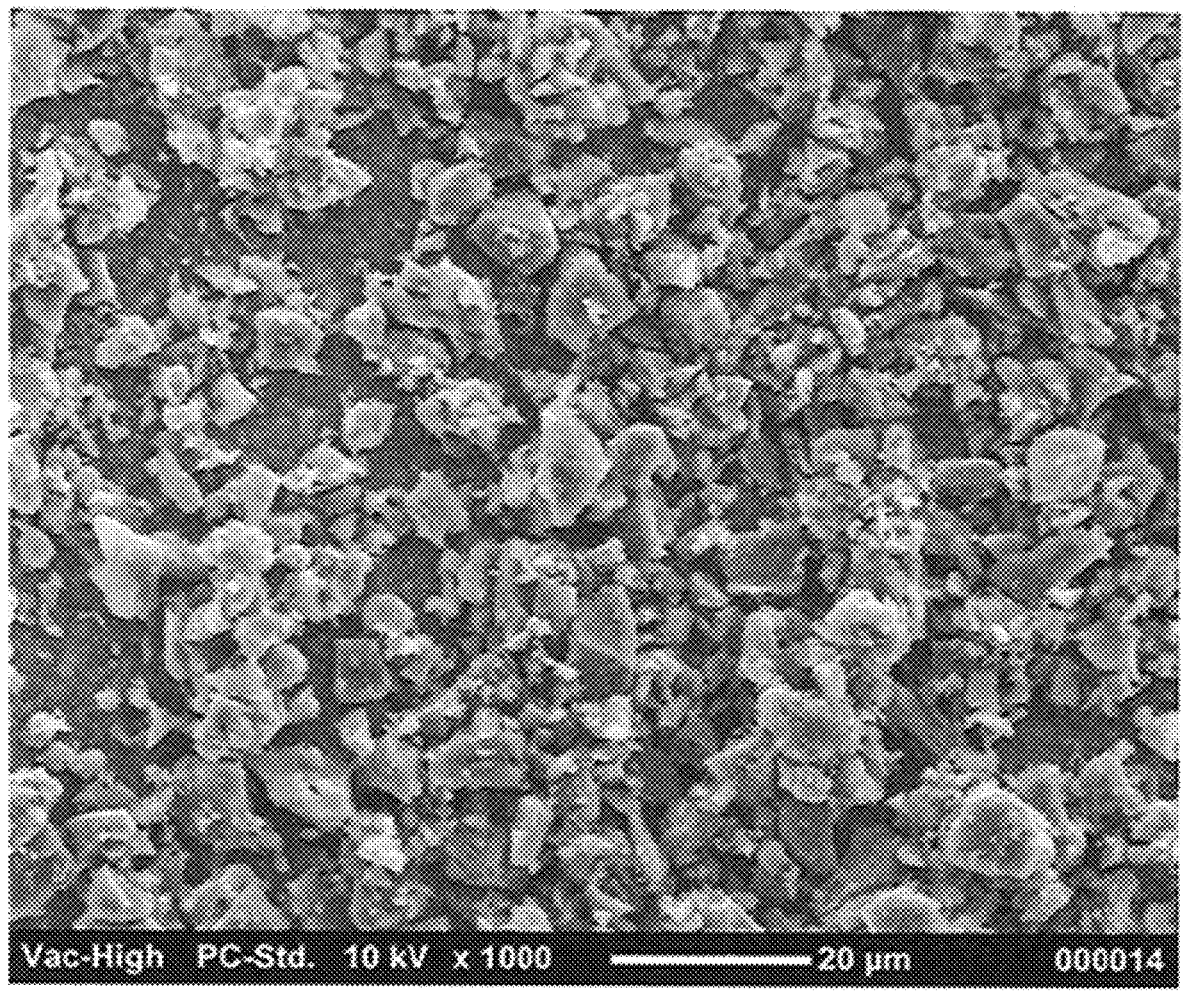
FIGS. 16 and 17 are SEM images at 1000× and 5000× magnification, respectively, of activated carbon particles.
Figure 17:
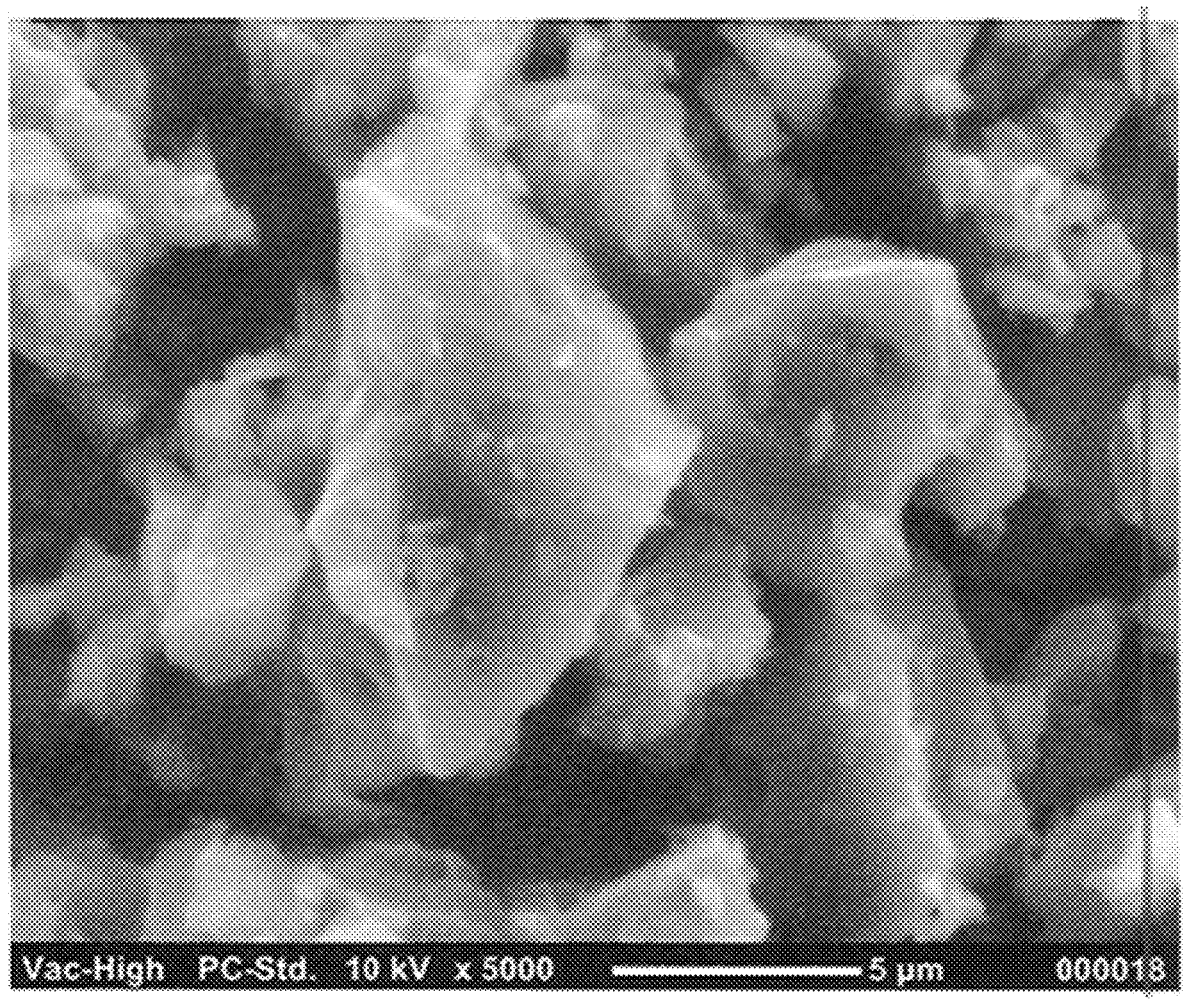
Figure 18:
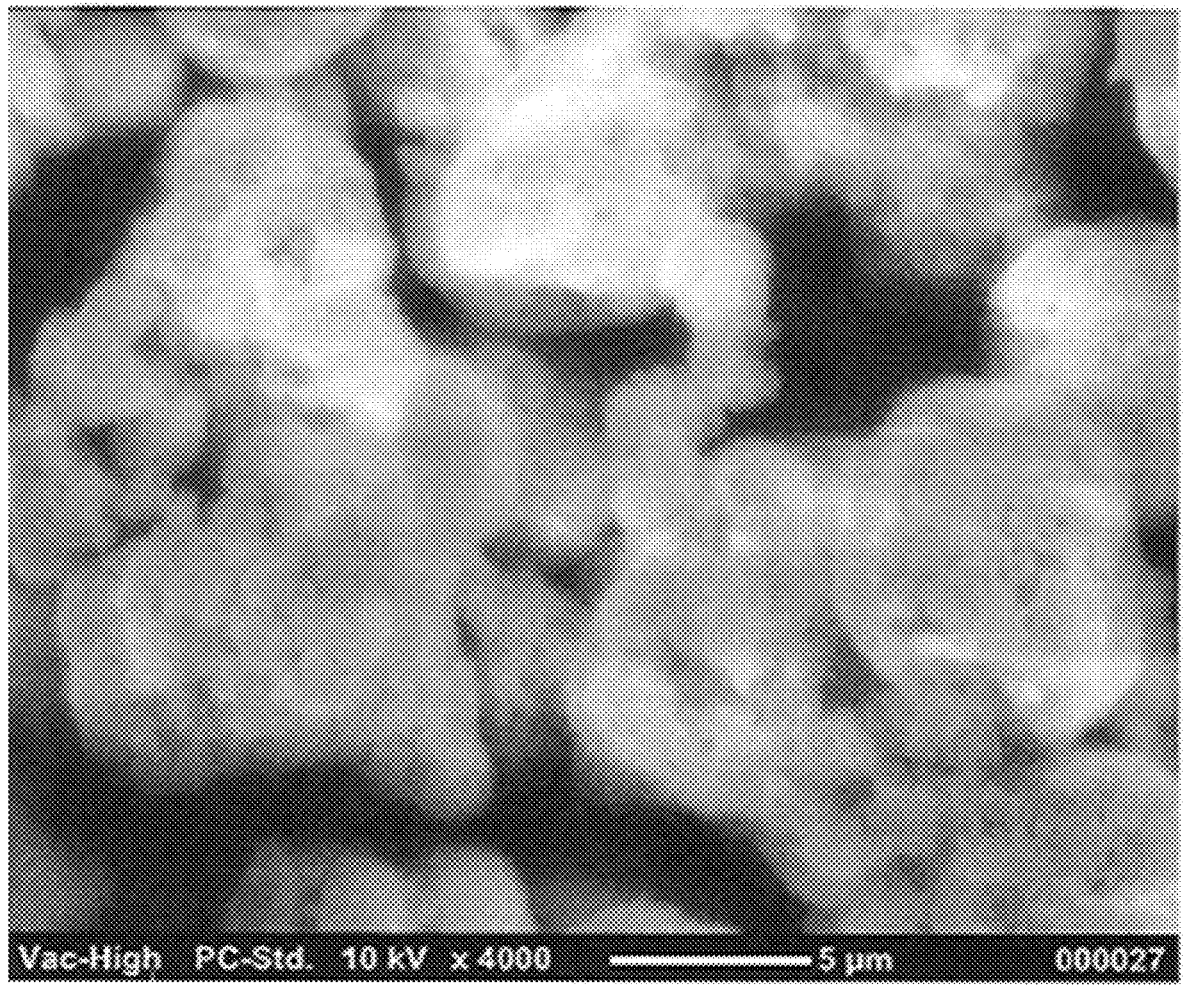
FIGS. 18 and 19 are SEM images at 4000× and 10000× magnification, respectively, of dry PVDF powder.
Figure 19:
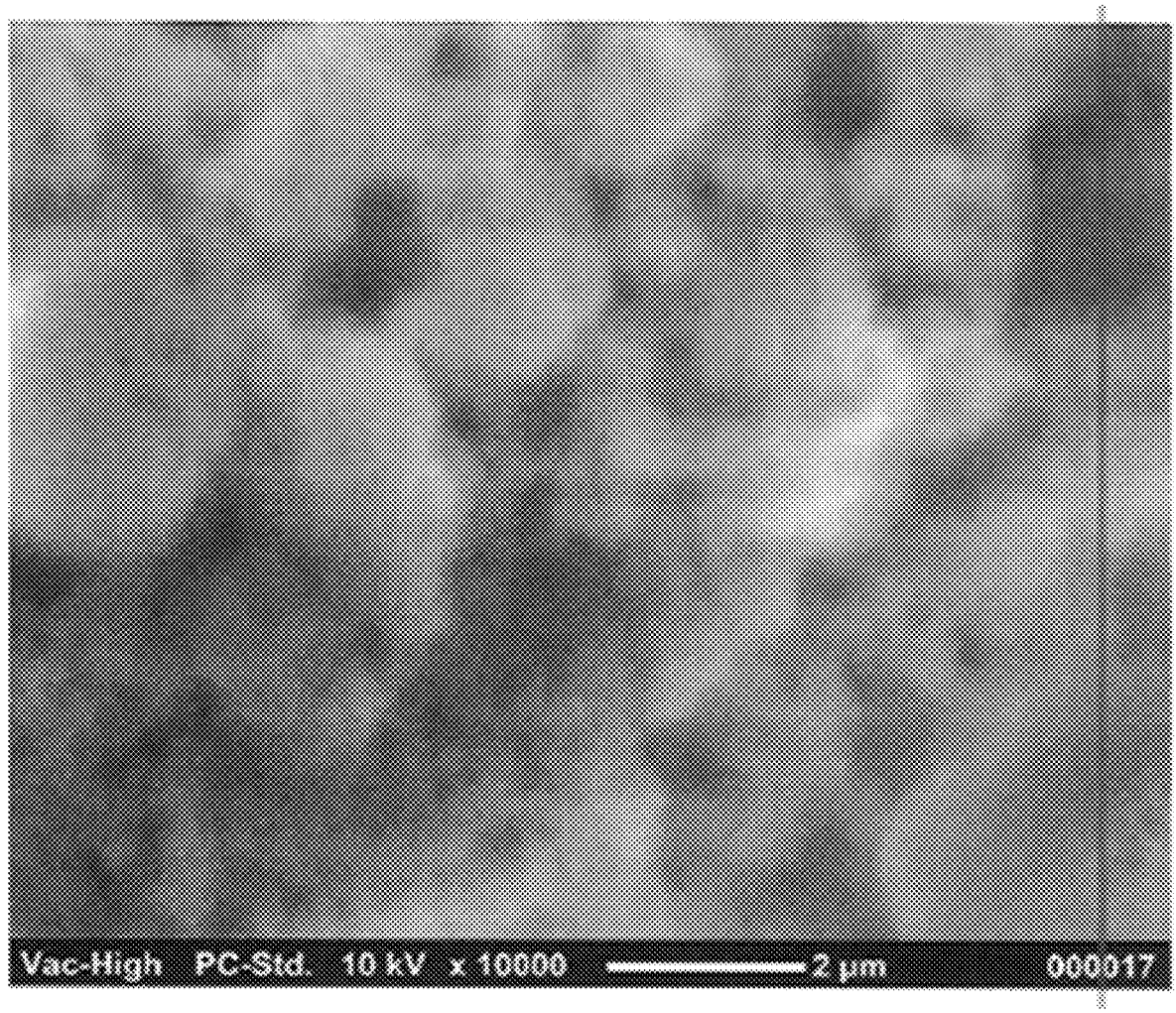
Figure 21:
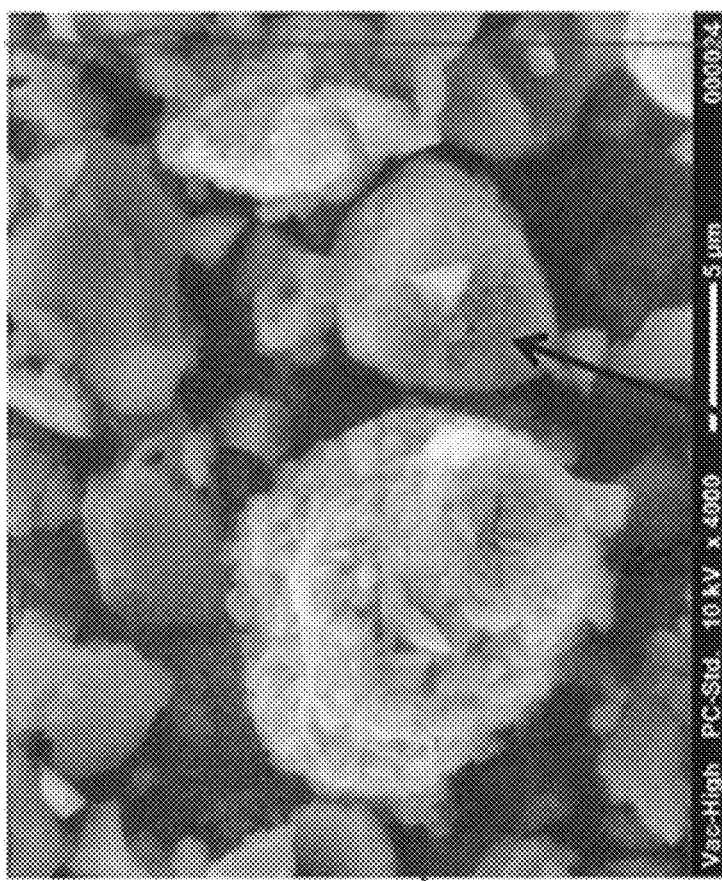
FIGS. 20 and 21 are SEM images at 1000× and 4000× magnification, respectively, of blended activated carbon and dry PVDF powder.
Figure 20:
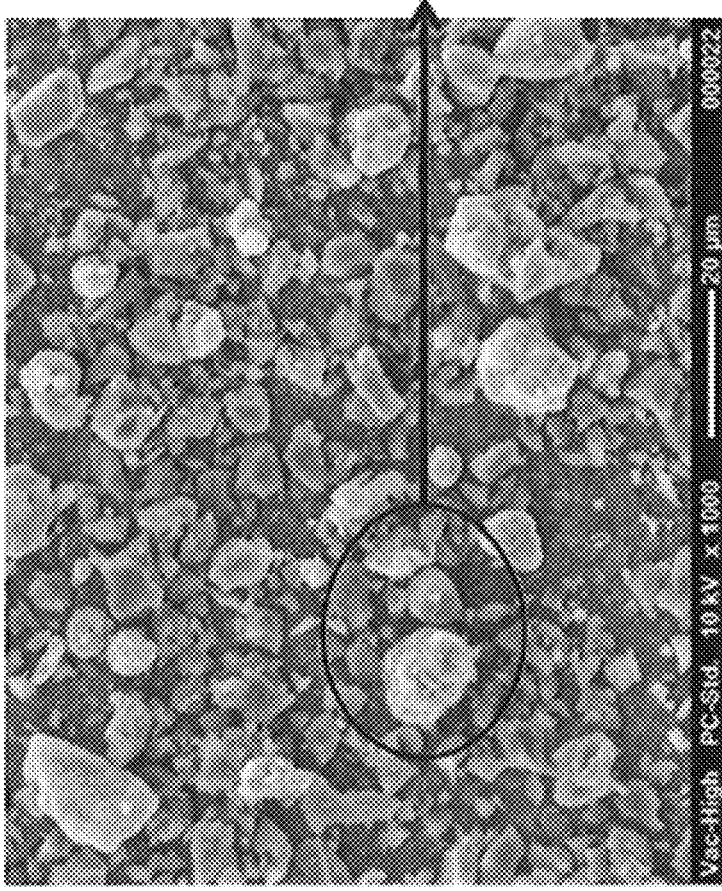

The fabrication process for forming the cathode electrode film according to one or more processes described herein included first blending activated carbon (e.g., YP-17D, for example available from Kuraray) with PVDF dry powder (e.g., PVDF dry powder available from Arkema) in a mass ratio of about 2:1 for about 10 minutes. The duration of blending may be adjusted to provide desired mixing of the activated carbon and PVDF. For example, the duration may be selected based on a configuration of the blender (e.g., a size and/or level of shear provided). FIG. 16 is a scanning electron microscopy (SEM) image at 1000× magnification activated carbon particles, and FIG. 17 is a SEM image at 5000× magnification of the activated carbon particles. FIG. 18 is a SEM image at 4000× magnification of dry PVDF powder and FIG. 19 is a SEM image at 10000× magnification of the dry PVDF powder. FIG. 20 is a SEM image at 1000× magnification, while FIG. 21 is a SEM image at 4000× magnification, of the blended dry powder comprising the activated carbon and PVDF.

Figure 22:
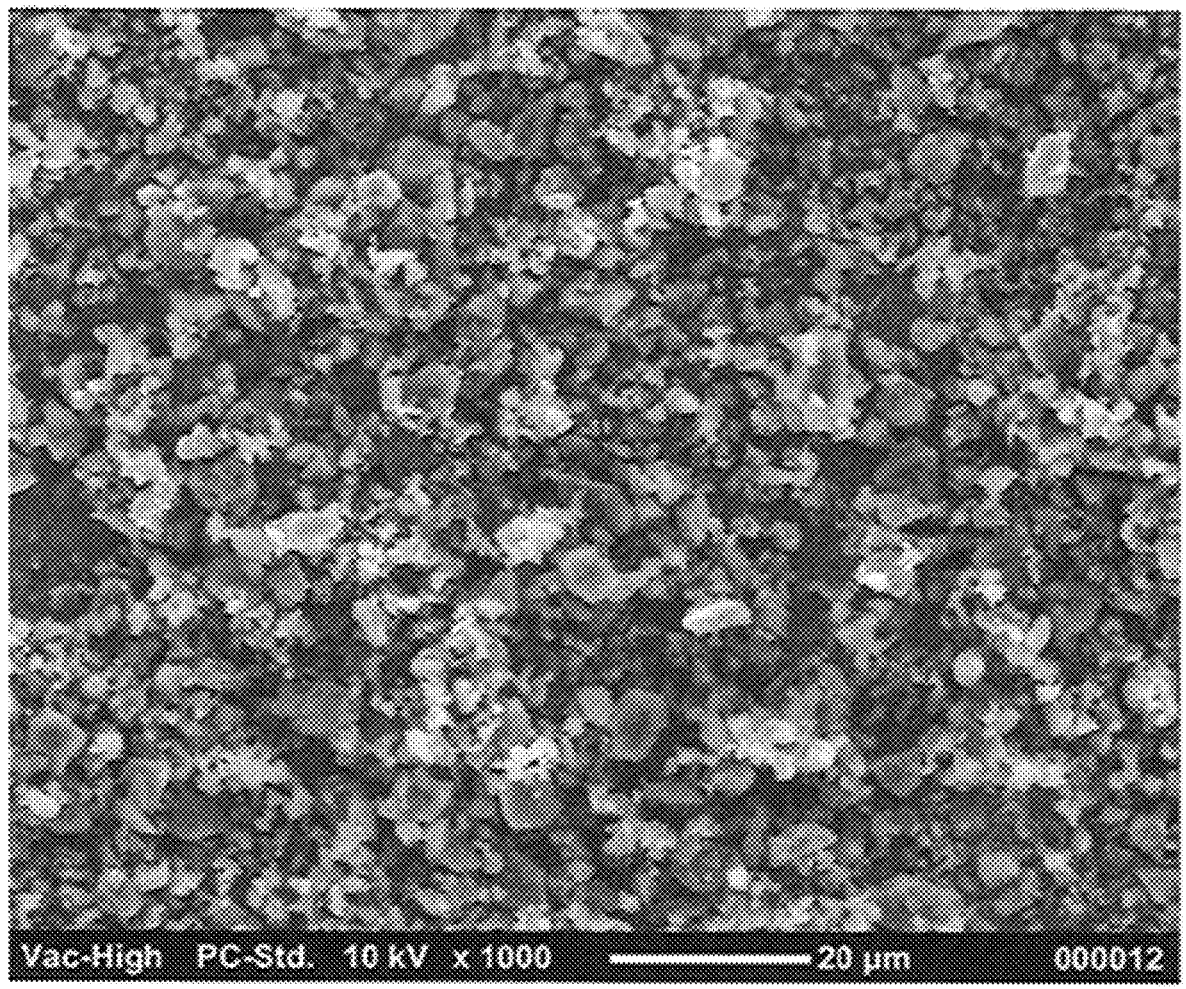
FIGS. 22 and 23 are SEM images at 1000× and 5000× magnification, respectively, of activated carbon and dry PVDF powder which were jet-milled subsequent to blending.
Figure 23:
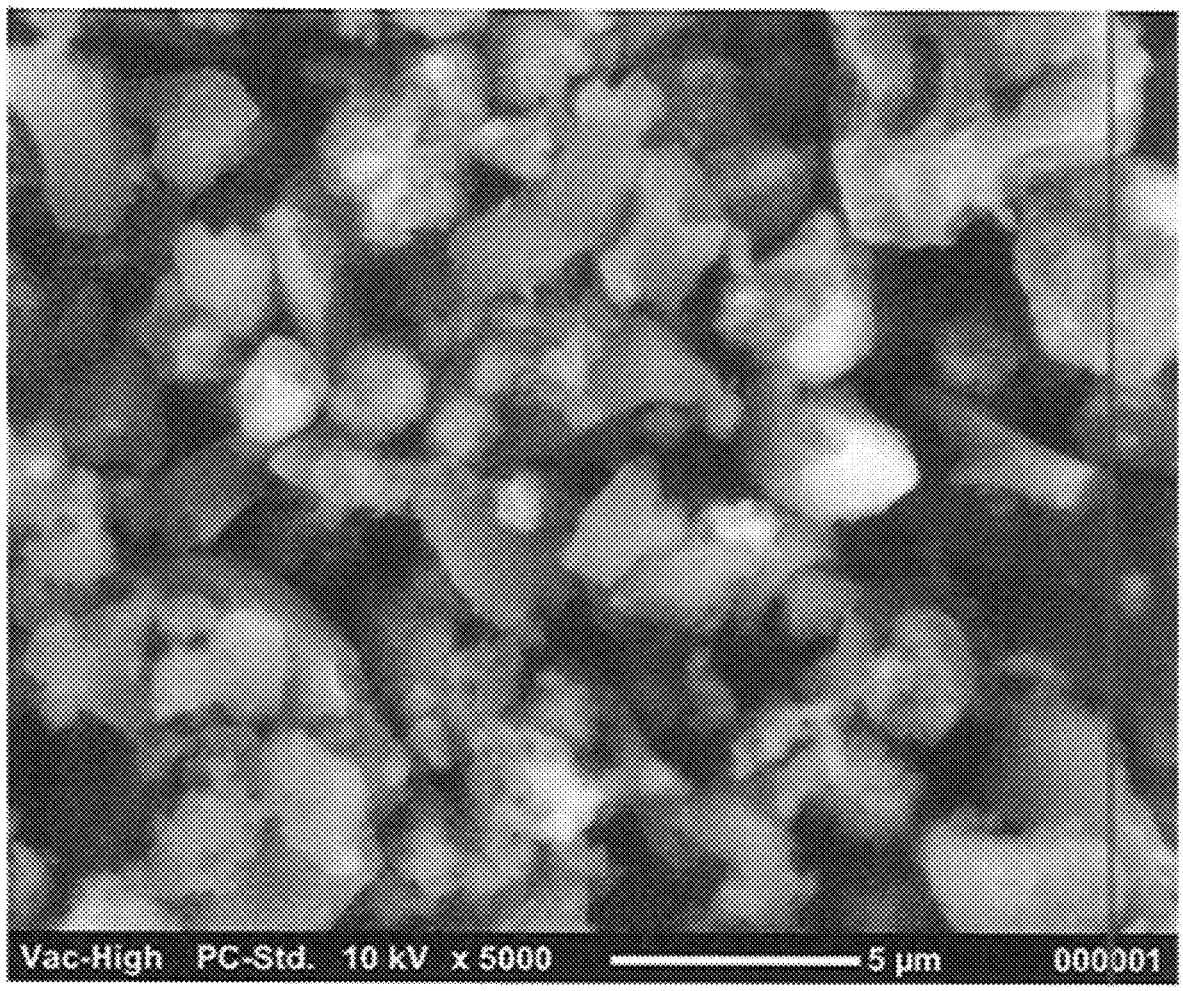

The resulting mixed powder comprising the activated carbon and PVDF was jet-milled under a feed and grinding pressure of about 80 pounds per square inch (psi). In some embodiments, a higher pressure may be used. For example, a pressure of about 40 psi to about 150 psi may be used. FIG. 22 is a SEM image at 1000× magnification of the jet-milled dry powder comprising activated carbon and PVDF, while FIG. 23 is a SEM image at 5000× magnification of the jet-milled dry powder.

NMC (e.g., available from Umicore), activated carbon and carbon black (e.g., Ketjenblack ECP600JD available from Lion Corporation) were blended until a powder tap density of about 2 grams per milliliter (g/mL) was achieved.

This blended powder comprising NMC, activated carbon, and carbon black was combined with the jet-milled mixture comprising activated carbon and PVDF by blending the two mixtures together for about 5 minutes. PTFE (e.g., available from DuPont) was subsequently added by blending for about an additional 10 minutes. The duration of blending may be adjusted to provide desired mixing of the blended powder and jet-milled mixture, for example to facilitate formation of a final electrode film having desired properties (e.g., having desired film integrity and/or film surface quality). For example, the duration may be selected based on a configuration of the blender (e.g., a size and/or level of shear provided).

Dry PVDF binder powder can include secondary particles which are aggregates of primary particles (e.g., having a size of about 100 nanometers to about 300 nanometers). As shown in FIGS. 18 and 19, these secondary particles can be in a size range of tens of microns (e.g., having a size of about 5 microns to about 50 microns). Without being limited by any particular theory or mode of operation, the dispersion of dry PVDF binder powder in cathode powder formulation facilitates formation of free-standing dry particles films demonstrating desired binding properties while being free of defects. For example, a reduction and/or elimination of the secondary particle aggregates can facilitate formation of cathode electrode films free of defects. Desired reduction and/or elimination of the secondary particle aggregates may be achieved by processing the dry PVDF powder with activated carbon in a 2 to 1 mass ratio. As described herein, other ratios may also be suitable. The larger PVDF particle aggregates can be seen in FIGS. 20 and 21 after processed by blending alone. FIGS. 22 and 23 show the same powder dispersion of FIGS. 20 and 21 after an additional jet-milling step. It can be clearly observed that the larger PVDF particle aggregates of FIGS. 20 and 21 are gone after jet-milling, thereby facilitating fabrication of cathode films without undesired defects, such as surface pitting, holes or voids, and/or dark streaks.

Figure 24:
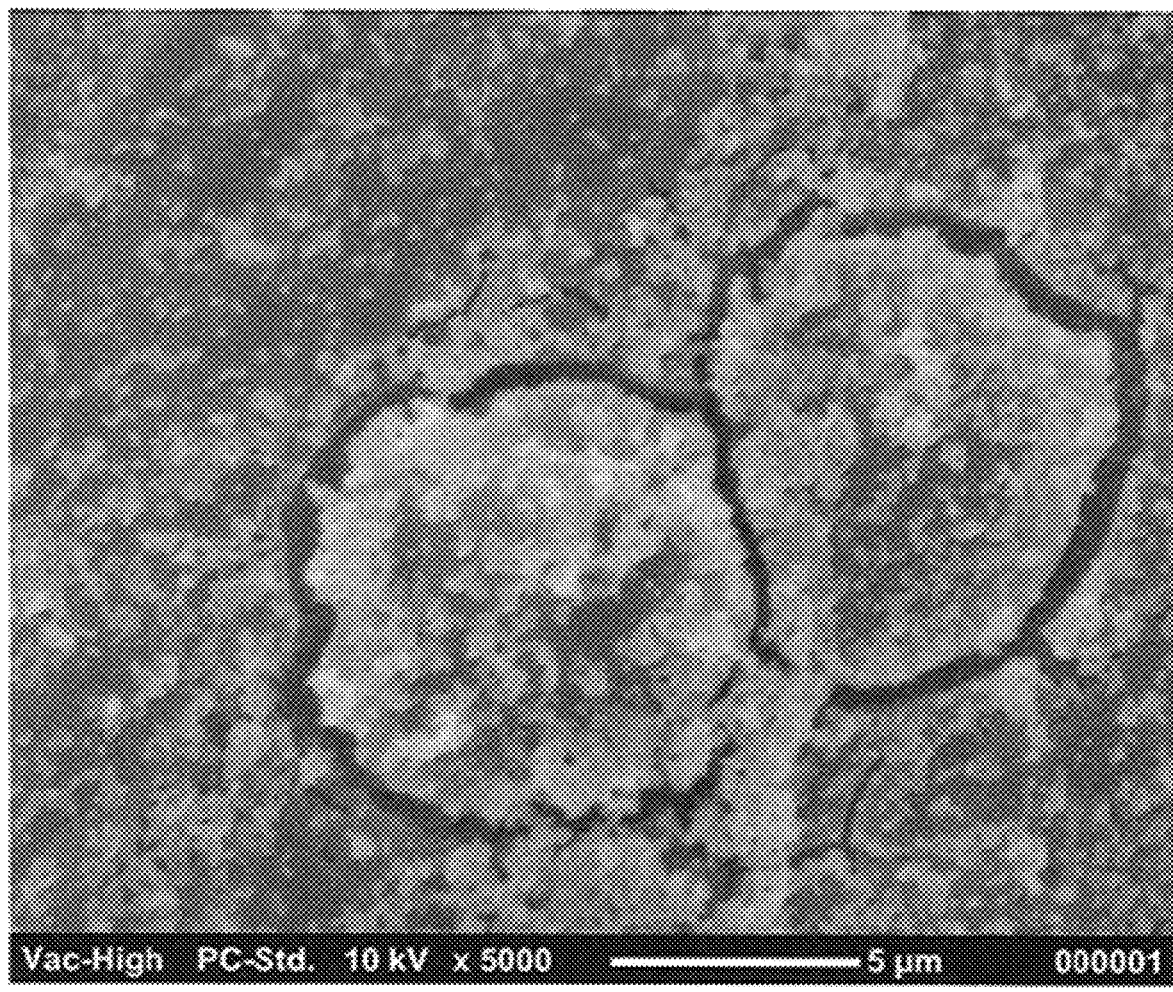
FIGS. 24 and 25 are SEM images at 5000× and 10000× magnification, respectively, of PVDF latex.
Figure 25:
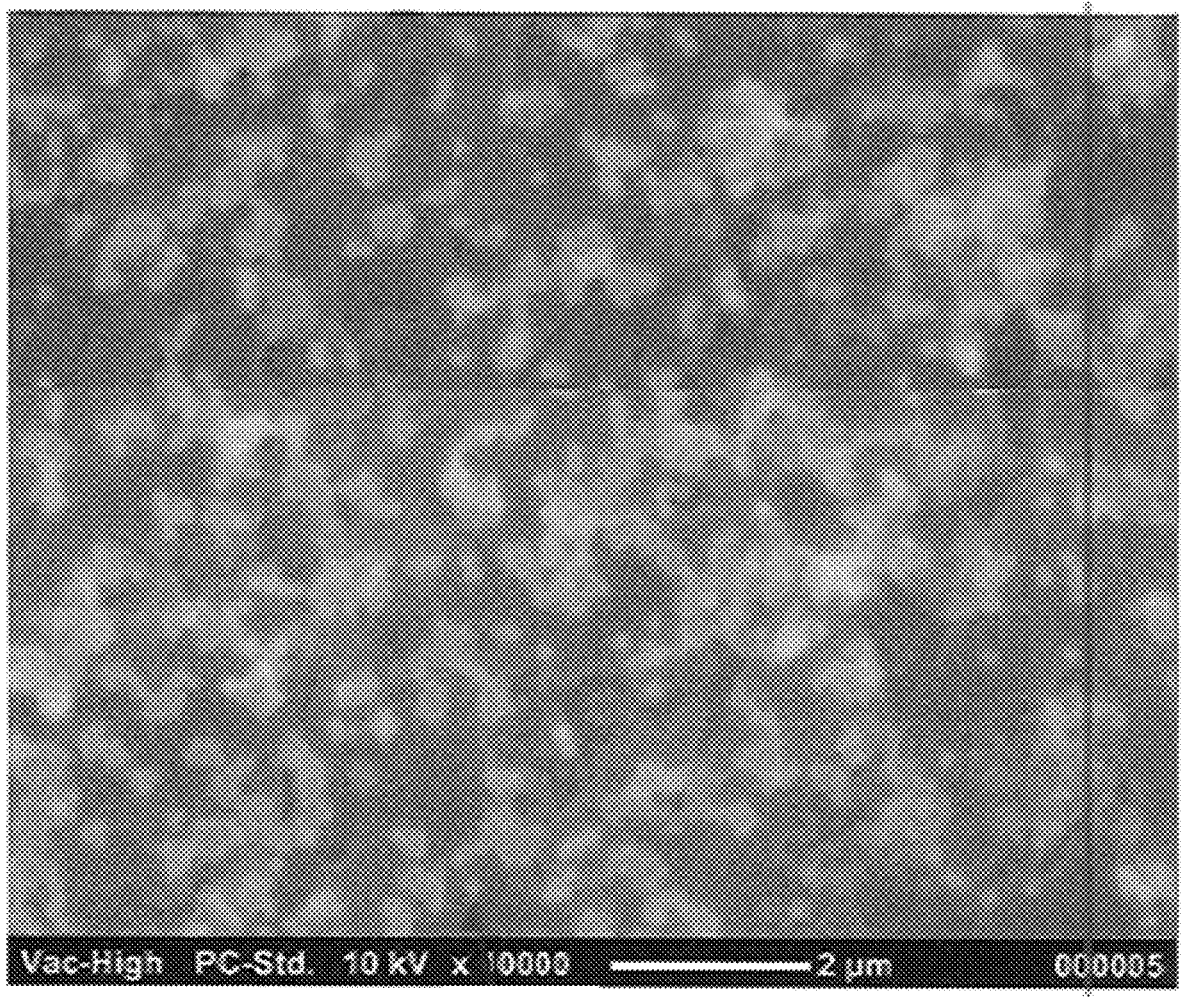
Figure 26:
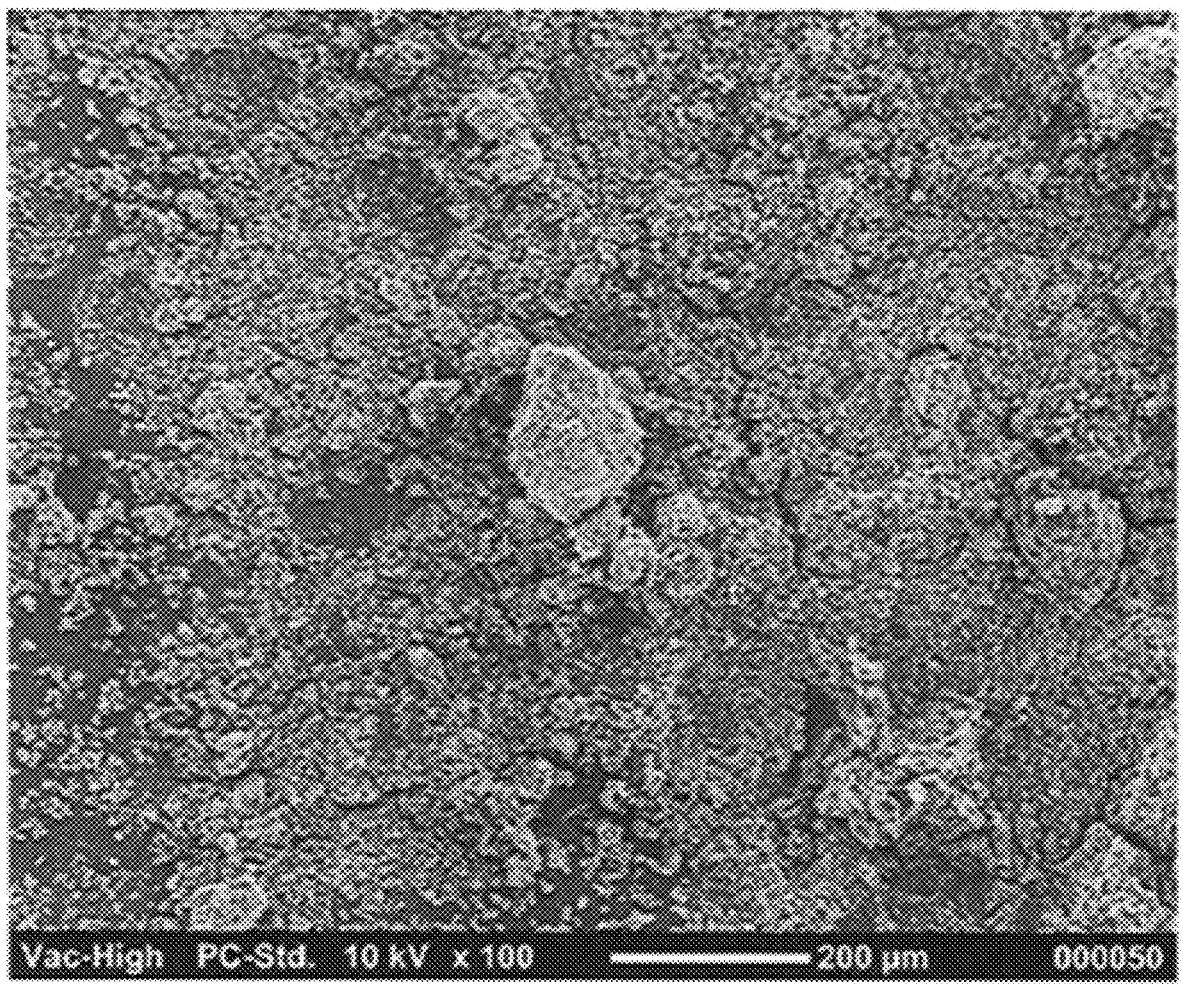
FIGS. 26 and 27 are SEM images at 100× and 500× magnification, respectively, of blended PVDF latex and activated carbon particles.

The comparative cathode electrode film fabricated using a wet process was fabricated using PVDF latex. The comparative cathode electrode film fabricated using PVDF latex had a composition of NMC:activated carbon:carbon black: PVDF:PTFE at a mass ratio of about 88:5:2:2:3. The comparative cathode electrode film was fabricated by spraying a first portion of the activated carbon (e.g., YP-17D available from Kuraray) with PVDF latex (e.g., available from Arkema) in a mass ratio of about 2:1 to form a paste. FIG. 24 is a SEM image at 5000× magnification SEM image of PVDF latex, and FIG. 25 is a SEM image at 10000× magnification of the PVDF latex. FIG. 26 is a SEM image at 200× magnification, while FIG. 27 is a SEM image at 500× magnification, of the dry powder including the activated carbon and PVDF latex after the two were mixed.

The paste was dried at about 110° C. for about 16 hours. The dried paste was then blended for about 1 minute. NMC (e.g., available from Umicore), a second portion of activated carbon and carbon lack (e.g., Ketjenblack ECP600JD available from Lion Corporation) were blended to achieve a powder tap density of about 2 g/ml. This powder was blended with the dried paste comprising the first portion of the activated carbon and PVDF latex powder for about 10 minutes. PTFE (e.g., available from DuPont) was subsequently added and blended for an additional 20 minutes.

Figure 27:
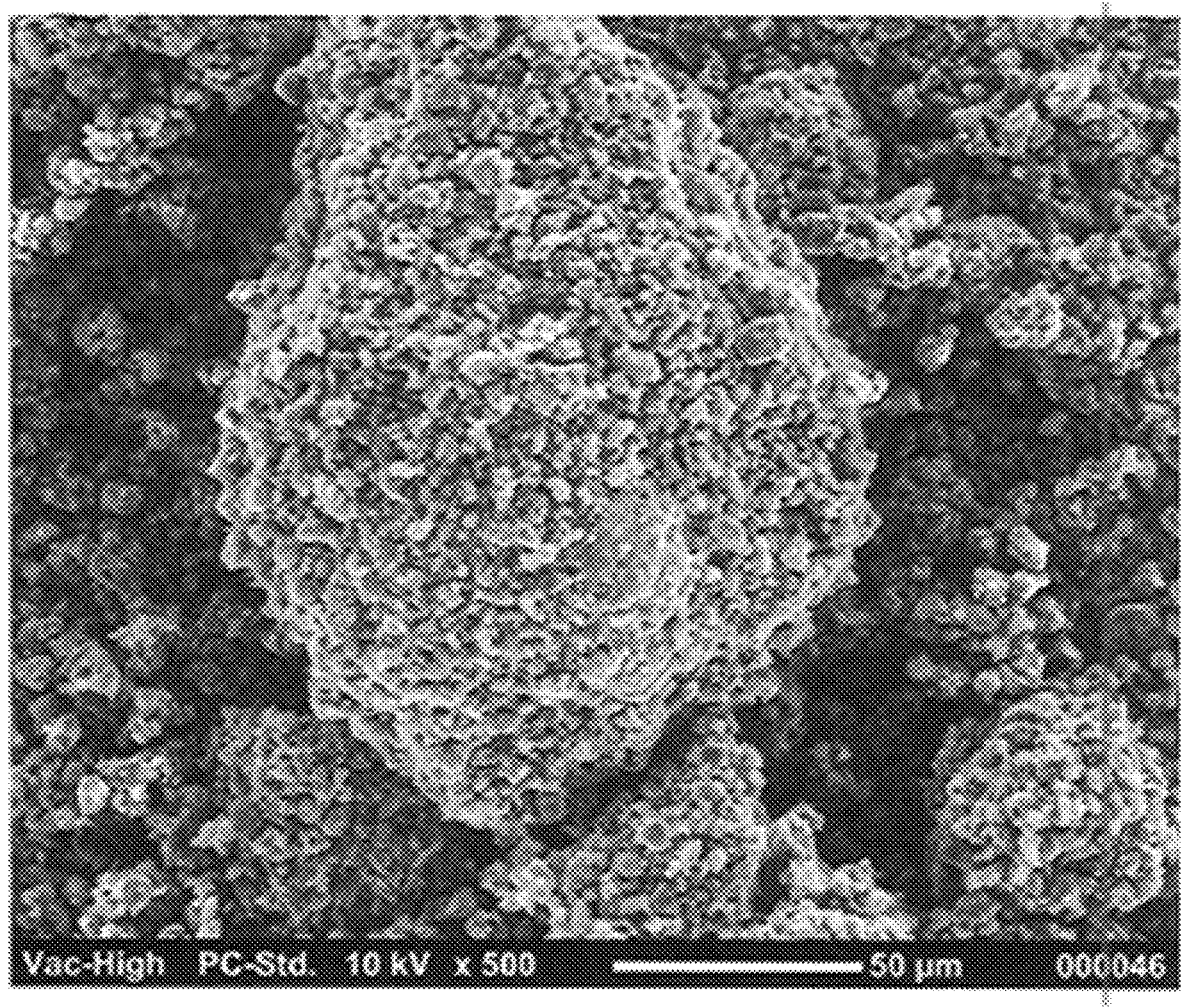

As shown in FIGS. 24 and 25, although the PVDF latex binder included well-dispersed primary PVDF particles (e.g., in a size regime of about a few hundred nanometers as shown in these figures), FIGS. 26 and 27 showed large particle aggregates when the PVDF latex was mixed with activated carbon. These larger aggregates can impart dark streaks and/or minor surface pitting in resulting free-standing films, thereby reducing the quality of the finished electrode films.

Figure 28:
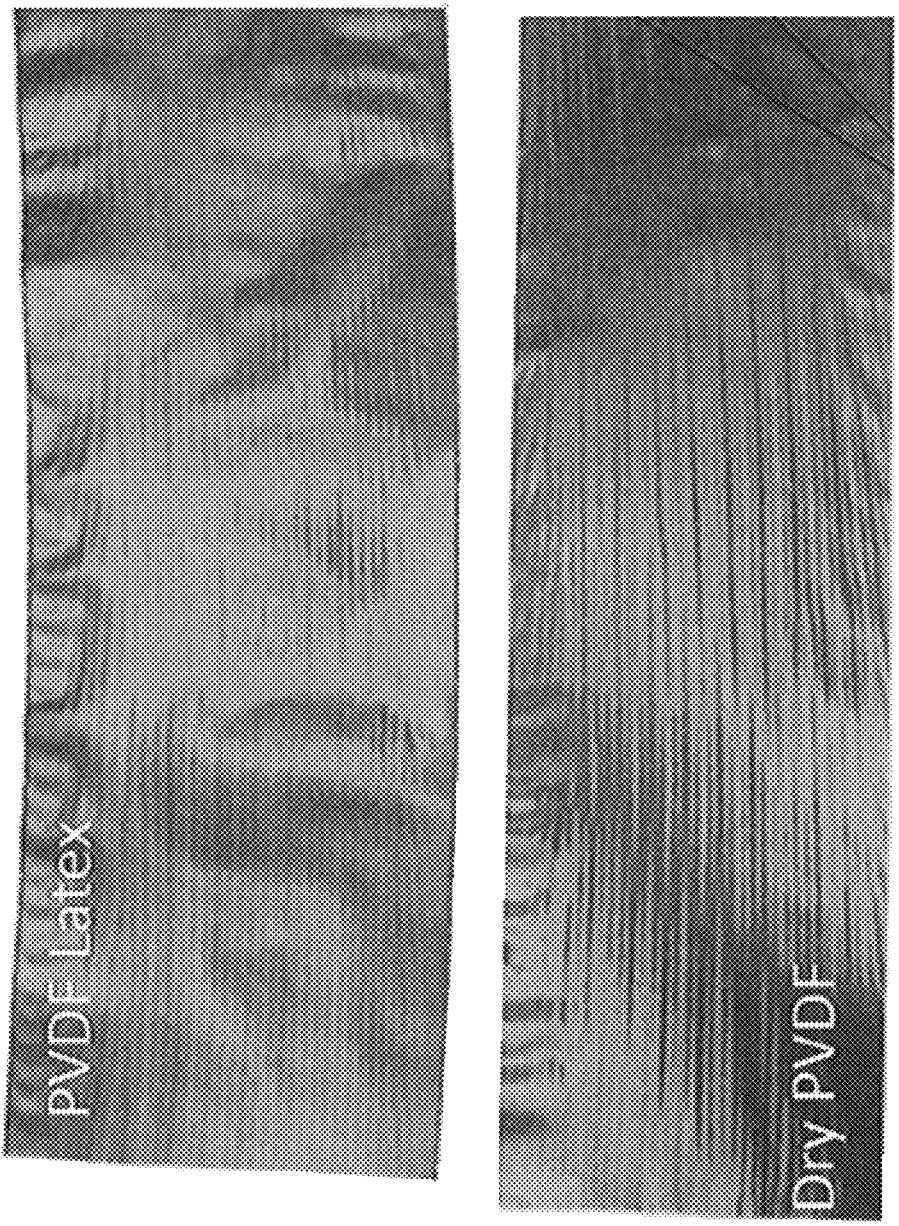
FIG. 28 are two photos comparing cathode electrode films formed using PVDF latex and dry PVDF powder.
Figure 29:
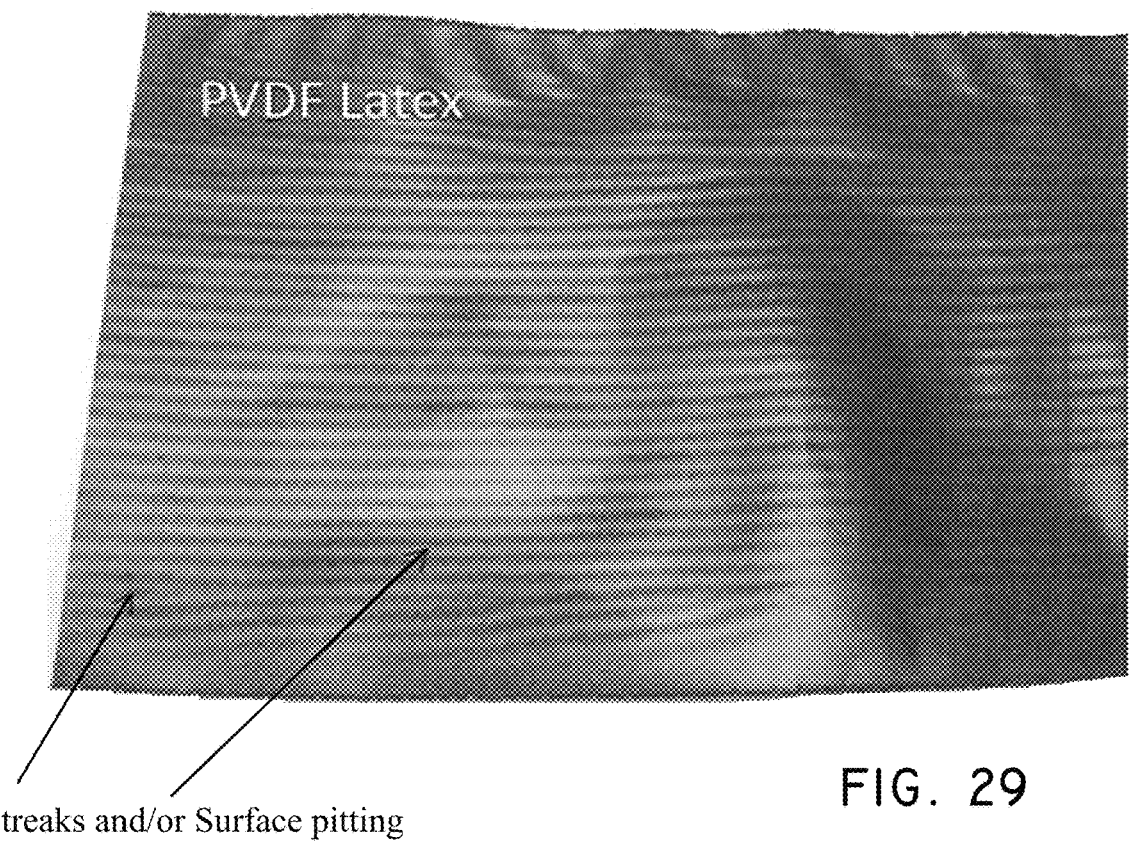
FIG. 29 is a photo showing a closer view of the cathode film formed using PVDF latex shown in FIG. 28.
Figure 30:
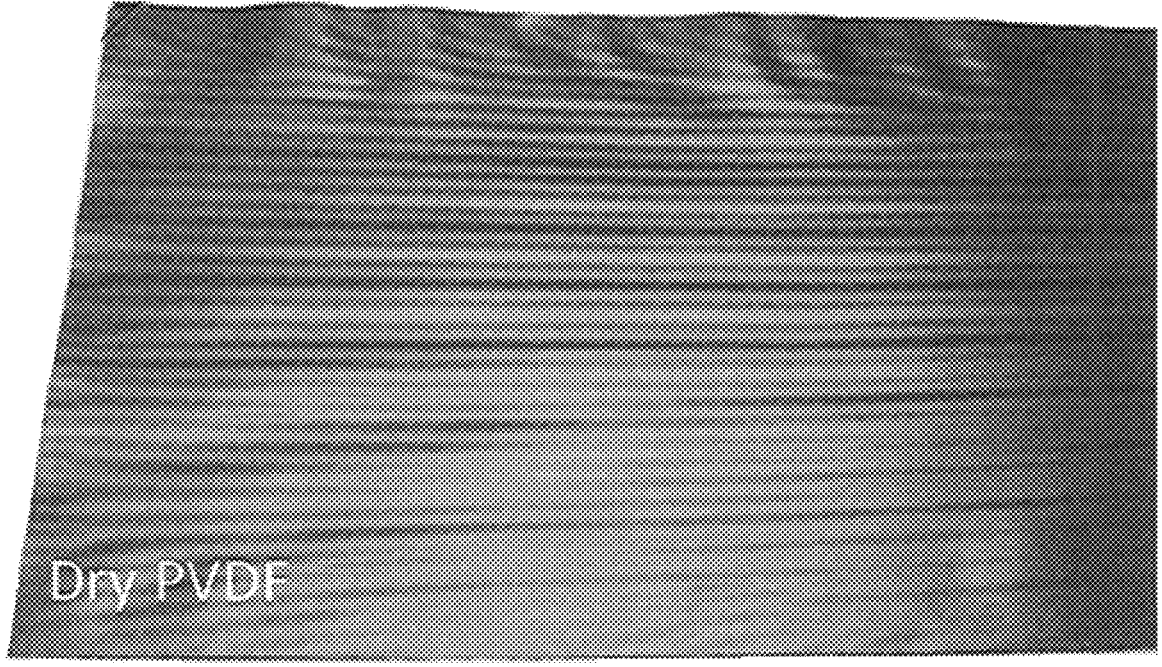
FIG. 30 is a photo showing a closer view of the cathode film formed using dry PVDF powder shown in FIG. 28.

FIG. 28 shows two photographs comparing the cathode electrode films produced using PVDF latex and dry PVDF powder. FIG. 29 provides a close-up photograph of the cathode electrode film produced using PVDF latex. As can be seen in FIG. 29, the cathode electrode film has surface defects. FIG. 30 provides a close-up photograph of the cathode film produced using dry PVDF. As can be seen in FIG. 30, the cathode electrode film fabricated using dry PVDF power does not demonstrate surface defects.

Figure 32:
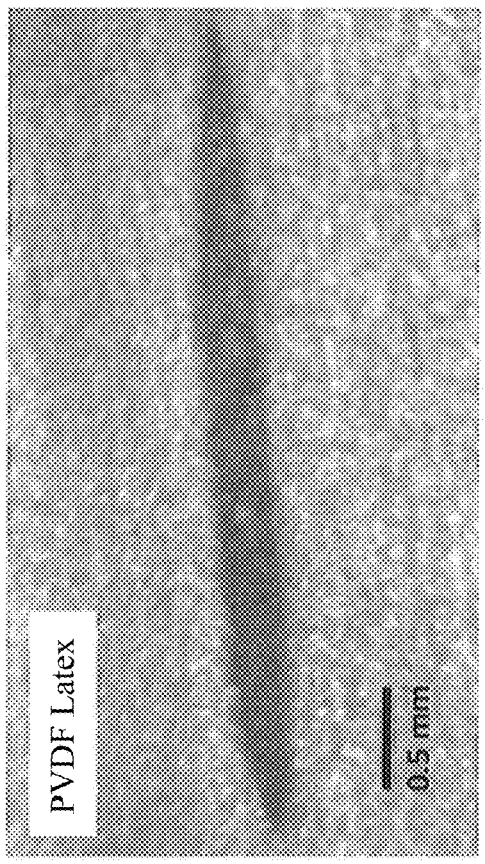
FIG. 32 is an optical image at 3× magnification of an example of a cathode electrode film fabricated using PVDF dry powder
Figure 31:
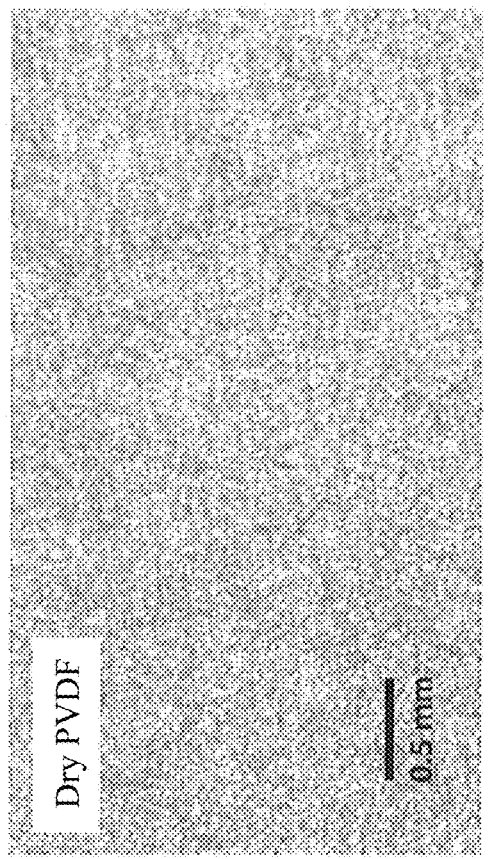
FIG. 31 is an optical image at 3× magnification of a cathode electrode film fabricated using PVDF latex.

FIG. 31 is an optical image at 3× magnification of the cathode film surface fabricated using the PVDF latex. FIG. 31 shows a black streak having a length of about 4 millimeters in length on the film. FIG. 32 is an optical image at 3× magnification of the cathode film surface fabricated using dry PVDF powder. No black streak is seen in FIG. 32. Accordingly, as demonstrated in FIGS. 28-32, when the jet-mill processing method is applied to disperse dry PVDF in the presence of activated carbon, a cathode electrode film may be fabricated without surface defects.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

While the above description has pointed out novel features of the invention as applied to various embodiments, the skilled person will understand that various omissions, substitutions, and changes in the form and details of the device or process illustrated may be made without departing from the scope of the invention.

What is claimed is:

1. An electrode film, comprising:
a composite binder material comprising fibrillized polytetrafluoroethylene (PTFE) and poly(ethylene oxide) (PEO); wherein the electrode film is a free standing dry electrode film, and wherein the electrode film is absent of solvent residue.

2. An energy storage device comprising the electrode film of claim 1, wherein the energy storage device comprises a lithium ion battery.

3. The electrode film of claim 1, wherein the composite binder material comprises up to 90 weight % PTFE.

4. The electrode film of claim 1, wherein the composite binder material comprises a mass ratio of 1:5 to 5:1 of the PTFE to the PEO.

5. The electrode film of claim 1, wherein the film comprises a cathode active material.

6. The electrode film of claim 1, wherein the electrode film comprises an anode active material.

7. An electrode film, comprising a composite binder material, wherein the composite binder material comprises fibrillized PTFE and at least one of polyvinylidene fluoride (PVDF), or a PVDF co-polymer; wherein the electrode film is a free-standing dry electrode film, and wherein the electrode film is absent of solvent residue.

8. An energy storage device comprising the electrode film of claim 7 wherein the energy storage device comprises a lithium ion battery.

9. The electrode film of claim 7, wherein the electrode film comprises an anode active material.

10. The electrode film of claim 9, comprising a carbon active material, wherein the carbon active material comprises graphite.

11. The electrode film of claim 7, wherein the composite binder material comprises up to 90 weight % PTFE.

12. The electrode film of claim 7, wherein the electrode film comprises a cathode active material.

13. The electrode film of claim 7, wherein the composite binder material comprises a mass ratio of 1:5 to 5:1 of the PTFE to the PVDF, or the PTFE to the PVDF co-polymer.

14. The electrode film of claim 7, wherein the electrode film comprises 2 weight % to 10 weight % of the composite binder material.

15. The electrode film of claim 1, wherein the electrode film comprises a porous carbon material and an active material selected from a lithium metal oxide, a lithium sulfide, or a combination thereof.

16. The electrode film of claim 15, wherein the porous carbon material is activated carbon.

17. The electrode film of claim 16, wherein the electrode film comprises a lithium metal oxide.

18. The electrode film of claim 17, wherein the lithium metal oxide comprises lithium nickel manganese cobalt oxide.

19. The electrode film of claim 1, wherein the electrode film comprises 2 weight % to 10 weight % of the composite binder material.

20. The electrode film of claim 4, wherein the composite binder material comprises a mass ratio of 1:3 to 3:1 of the PTFE to the PEO.

* * * * *